US009870373B2

(12) United States Patent
Klughart

(10) Patent No.: US 9,870,373 B2
(45) Date of Patent: *Jan. 16, 2018

(54) DAISY-CHAIN STORAGE SYNCHRONIZATION SYSTEM AND METHOD

(71) Applicant: Kevin Mark Klughart, Denton, TX (US)

(72) Inventor: Kevin Mark Klughart, Denton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,663

(22) Filed: May 15, 2017

(65) Prior Publication Data

US 2017/0249332 A1   Aug. 31, 2017

Related U.S. Application Data

(63) Continuation-in-part of application No. 15/284,113, filed on Oct. 3, 2016, now Pat. No. 9,652,343, which
(Continued)

(51) Int. Cl.
*G06F 3/00* (2006.01)
*G06F 17/30* (2006.01)
(Continued)

(52) U.S. Cl.
CPC ...... *G06F 17/30203* (2013.01); *G06F 3/0607* (2013.01); *G06F 3/0619* (2013.01);
(Continued)

(58) Field of Classification Search
CPC .. G06F 3/0607; G06F 3/0689; G06F 13/4247; G06F 13/00; G06F 13/409
See application file for complete search history.

(56) References Cited

U.S. PATENT DOCUMENTS 4,873,665 A   10/1989 Jiang et al.
5,164,613 A   11/1992 Mumper et al.
(Continued)

OTHER PUBLICATIONS

HCL, ashok.madaan@hcl.In, SATA Host Controller, pp. 1-2, India.
(Continued)

*Primary Examiner* — Ernest Unelus
(74) *Attorney, Agent, or Firm* — Kevin M. Klughart; David W. Carstens; Carstens & Cahoon, LLP

(57) ABSTRACT

A daisy-chain storage synchronization (DSS) system and method that permits a daisy-chain of interconnected pass-thru disk drive controllers (PTDDCs) each connected to a SATA local disk drive (LDD) disk storage element (DSE) to support state synchronization within PTDDCs in the daisy-chain is disclosed. The PTDDCs within the daisy-chain are configured to individually maintain drive state information (DSI) relating to the LDD as well as chain state information (CSI) relating to the individual PTDDCs within the daisy-chain. This state information may be modified on receipt of out-of-band signaling (OBS) from other PTDDC elements up the daisy-chain as well as OBS from other PTDDC elements down the daisy-chain. CSI is determined in part by conventional SATA OBS state register protocols that are modified by internal state registers (ISR) in each individual PTDDC daisy-chain element so as to make the DSS transparent to existing SATA OBS single-disk standard hardware command protocols.

20 Claims, 32 Drawing Sheets

Related U.S. Application Data is a continuation-in-part of application No. 14/886,616, filed on Oct. 19, 2015, now Pat. No. 9,460,110, which is a continuation-in-part of application No. 14/685,439, filed on Apr. 13, 2015, now Pat. No. 9,164,946, which is a continuation of application No. 14/526,855, filed on Oct. 29, 2014, now Pat. No. 9,015,355, which is a continuation of application No. 14/317,892, filed on Jun. 27, 2014, now Pat. No. 8,943,227, application No. 15/595,663, filed on May 15, 2017, which is a continuation-in-part of application No. 14/314,143, filed on Jun. 25, 2014, now Pat. No. 8,914,549, and a continuation-in-part of application No. 13/200,242, filed on Sep. 21, 2011, now Pat. No. 8,799,523, and a continuation-in-part of application No. 13/200,572, filed on Sep. 25, 2011, now Pat. No. 8,813,165.

(51) Int. Cl.
    G06F 3/06      (2006.01)
    G06F 11/20     (2006.01)
    G06F 13/40     (2006.01)
    G06F 13/42     (2006.01)

(52) U.S. Cl.
    CPC .......... G06F 3/0643 (2013.01); G06F 3/0655 (2013.01); G06F 3/0658 (2013.01); G06F 3/0685 (2013.01); G06F 3/0689 (2013.01); G06F 11/2038 (2013.01); G06F 11/2058 (2013.01); G06F 11/2069 (2013.01); G06F 13/409 (2013.01); G06F 13/4247 (2013.01)

(56) References Cited

U.S. PATENT DOCUMENTS

| | | |
|---|---|---|
| 5,299,156 A | 3/1994 | Jiang et al. |
| 5,363,361 A | 11/1994 | Bakx |
| 5,532,958 A | 7/1996 | Jiang et al. |
| 5,926,602 A | 7/1999 | Okura |
| 6,118,690 A | 9/2000 | Jiang et al. |
| 6,324,338 B1 | 11/2001 | Wood et al. |
| 6,405,239 B1 | 6/2002 | Addington et al. |
| 7,373,443 B2 | 5/2008 | Seto |
| 7,600,070 B1 | 10/2009 | Linnell |
| 7,814,272 B2 | 10/2010 | Barrall et al. |
| 7,814,273 B2 | 10/2010 | Barrall |
| 7,818,531 B2 | 10/2010 | Barrall |
| 7,873,782 B2 | 1/2011 | Terry et al. |
| 7,889,964 B1 | 2/2011 | Barton et al. |
| 8,074,105 B2 | 12/2011 | Kalwitz et al. |
| 8,095,760 B2 | 1/2012 | Mizuno et al. |
| 8,352,649 B2 | 1/2013 | Liu et al. |
| 8,799,523 B2 | 8/2014 | Klughart |
| 8,813,165 B2 | 8/2014 | Klughart |
| 8,914,549 B2 | 12/2014 | Klughart |
| 8,943,227 B2 | 1/2015 | Klughart |
| 9,015,355 B2 | 4/2015 | Klughart |
| 9,164,946 B2 | 10/2015 | Klughart |
| 2002/0102092 A1 | 8/2002 | Thai |
| 2003/0014762 A1 | 1/2003 | Conover et al. |
| 2003/0063893 A1 | 4/2003 | Read |
| 2005/0195660 A1 | 9/2005 | Kavuri et al. |
| 2005/0207253 A1 | 9/2005 | Takase et al. |
| 2006/0036777 A1 | 2/2006 | Innan et al. |
| 2007/0149148 A1 | 6/2007 | Yoshikawa et al. |
| 2007/0266037 A1 | 11/2007 | Terry et al. |
| 2008/0046947 A1 | 2/2008 | Katznelson |
| 2008/0068513 A1 | 3/2008 | Ariyoshi et al. |
| 2008/0162811 A1 | 7/2008 | Steinmetz et al. |
| 2009/0016009 A1 | 1/2009 | Barrall et al. |
| 2009/0036067 A1 | 2/2009 | Rofougaran |
| 2009/0067363 A1 | 3/2009 | Ruiz et al. |
| 2009/0168654 A1* | 7/2009 | Mies ............... H04L 43/12 370/241 |
| 2009/0222623 A1 | 9/2009 | Nakamura et al. |
| 2009/0259791 A1 | 10/2009 | Mizuno et al. |
| 2009/0292843 A1 | 11/2009 | Haban et al. |
| 2010/0049919 A1 | 2/2010 | Winokur et al. |
| 2010/0064104 A1 | 3/2010 | Steinmetz et al. |
| 2010/0146206 A1 | 6/2010 | Yochai et al. |
| 2010/0257401 A1 | 10/2010 | Stolowitz |
| 2011/0013882 A1 | 1/2011 | Kusunoki et al. |
| 2011/0035565 A1 | 2/2011 | Barrall |
| 2011/0060773 A1 | 3/2011 | Itoh |
| 2011/0072233 A1 | 3/2011 | Dawkins et al. |
| 2011/0145452 A1 | 6/2011 | Schilling et al. |
| 2011/0252007 A1 | 10/2011 | Cho et al. |
| 2011/0283150 A1 | 11/2011 | Konishi et al. |
| 2012/0266027 A1 | 10/2012 | Itoyama et al. |
| 2012/0278552 A1 | 11/2012 | Singh et al. |
| 2012/0311256 A1 | 12/2012 | Nakajima et al. |
| 2013/0145106 A1 | 6/2013 | Kan |
| 2013/0254429 A1 | 9/2013 | Mimata et al. |

OTHER PUBLICATIONS

Hitachi Global Storage Technologies (datasheet); Hitachi Deskstar 7K1000 Hard Disk Drive Specification, Models HDS7721010KLA330, HDS7721075KLA330; Rev. 0.1, Jun. 21, 2007; USA.

Hitachi Global Storage Technologies (datasheet); Hitachi Deskstar 7K3000 Hard Disk Drive Specification, Models HDS723020BLA642, HDS723015BLA642; Rev. 1.0, Oct. 28, 2010; USA.

Hitachi Global Storage Technologies (datasheet); Hitachi Deskstar 7K3000 Hard Disk Drive Specification, Models HUA723030ALA640, HUA723020ALA640; Rev. 1.1, Jan. 25, 2011; USA.

Intel Corporation, PHY Interface for the PCI Express* Architecture (PIPE), for SATA 3.0, Revision .7, 2007-2010, pp. 1-30, US.

Iomega; "Using Iomega StorCenter IX 12-300R with Windows Server2008 R2 Hyper-V Over iSCSI"; White Paper (online); Iomega Corporation, Mar. 2011; http://download.iomega.com/nas/pdfs/hyperv-overiscsi.pdf.

Serial ATA International Organization (specification), Serial ATA Revision 2.5—High Speed Serialized at Attachment; www.sata-io.org; Oct. 27, 2005; USA.

Serial ATA International Organization (specification), Serial ATA Revision 2.6—High Speed Serialized at Attachment; www.sata-io.org; Feb. 15, 2007; USA.

Serial ATA International Organization (specification), Serial ATA Revision 3.0—High Speed Serialized at Attachment; www.sata-io.org; Jun. 2, 2009; USA.

ISA/US, International Search Report and Written Opinion for PCT/US2012/058619 dated Dec. 17, 2012.

ISA/US, International Search Report and Written Opinion for PCT/US2012/058652 dated Jan. 3, 2013.

* cited by examiner

DAISY-CHAIN STORAGE SYNCHRONIZATION SYSTEM AND METHOD

CROSS REFERENCE TO RELATED APPLICATIONS

This application is a Continuation-In-Part (CIP) Patent Application of and incorporates by reference United States Utility Patent Application for RAID HOT SPARE SYSTEM AND METHOD by inventor Kevin Mark Klughart, filed with the USPTO on Oct. 3, 2016, with Ser. No. 15/284,113, EFSID 27108165, confirmation, number 7971, and issued as U.S. Pat. No. 9,652,343 on May 16, 2017.

Application Ser. No. 15/284,113 is a Continuation-In-Part (CIP) Patent Application of and incorporates by reference United States Utility Patent Application for FILE SYSTEM EXTENSION SYSTEM AND METHOD by inventor Kevin Mark Klughart, filed with the USPTO on Oct. 19, 2015, with Ser. No. 14/886,616, EFSID 23823476, confirmation number 8917, and issued as U.S. Pat. No. 9,460,110 on Oct. 4, 2016.

Application Ser. No. 14/886,616 is a Continuation-In-Part (CIP) Patent Application of and incorporates by reference United States Utility Patent Application for DATA STORAGE RAID ARCHITECTURE EXTENSION SYSTEM AND METHOD by inventor Kevin Mark Klughart, filed with the USPTO on Apr. 13, 2015, with Ser. No. 14/685,439, EFSID 22049250, confirmation number 6962, and issued as U.S. Pat. No. 9,164,946 on Oct. 20, 2015.

Application Ser. No. 14/685,439 is a Continuation Patent Application (CPA) of and incorporates by reference United States Utility Patent Application for DATA STORAGE ARCHITECTURE EXTENSION SYSTEM AND METHOD by inventor Kevin Nark Klughart, filed with the USPTO on Oct. 29, 2014, with Ser. No. 14/526,855, EFSID 20533135, confirmation number 8572, and issued as U.S. Pat. No. 9,015,355 on Apr. 21, 2015.

Application Ser. No. 14/526,855 is a Continuation Patent Application (CPA) of and incorporates by reference United States Utility Patent Application for DATA STORAGE ARCHITECTURE EXTENSION SYSTEM AND METHOD by inventor Kevin Mark Klughart, filed with the USPTO on Jun. 27, 2014, with Ser. No. 14/317,892, confirmation number 5023, and issued as U.S. Pat. No. 8,943,227 on Jan. 27, 2015.

This application is a Continuation-in-part (CIP) patent application of and incorporates by reference United States Utility Patent Application for DATA STORAGE ARCHITECTURE EXTENSION SYSTEM AND METHOD by inventor Kevin Mark Klughart, filed with the USPTO on Jun. 25, 2014, with Ser. No. 14/314,143, confirmation number 7667, and issued as U.S. Pat. No. 8,914,549 on Dec. 16, 2014.

This application is a Continuation-in-part (CIP) patent application of and incorporates by reference United States Utility Patent Application for DATA STORAGE ARCHITECTURE EXTENSION SYSTEM AND METHOD by inventor Kevin Mark Klughart, filed with the USPTO on Sep. 21, 2011, with Ser. No. 13/200,242, confirmation number 8668, and issued as U.S. Pat. No. 8,799,523 on Aug. 5, 2014.

This application claims benefit under 35 U.S.C. §120 and incorporates by reference United States Utility Patent Application for DATA STORAGE ARCHITECTURE EXTENSION SYSTEM AND METHOD by inventor Kevin Mark Klughart, filed with the USPTO on Sep. 21, 2011, with Ser. No. 13/200,242, confirmation number 8668, and issued as U.S. Pat. No. 8,799,523 on Aug. 5, 2014.

This application claims benefit under 35 U.S.C. §120 and incorporates by reference United States Utility Patent Application for AUDIO/VIDEO STORAGE/RETRIEVAL SYSTEM AND METHOD by inventor Kevin Mark Klughart, filed with the USPTO on Sep. 25, 2011, with Ser. No. 13/200,572, confirmation number 7146, and issued as U.S. Pat. No. 8,813,165 on Aug. 19, 2014.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that, the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems/methods associated with computer data storage, and specifically to systems/methods used to store data on disk drives, and in some preferred embodiments, storage of data on disk drives connected to computer systems running under a variety of operating system environments that implement a file system on the disk drives. In some preferred applications the present invention allows storage arrays to be constructed using pass-thru disk drive controllers (PTDDC) (each of which is connected to a SATA local disk drive (LDD) disk storage element (DSE)) connected in a daisy-chain fashion in which the individual members of the PTDDC daisy-chain may be synchronized using standard SATA out-of-band signaling (OBS) commands in conjunction with internal PTDDC hardware that are configured to individually maintain drive state information (DSI) relating to the LDD as well as chain state information (CSI) relating to the individual PTDDC within the daisy-chain.

PRIOR ART AND BACKGROUND OF THE INVENTION

The following discussion provides background application context information regarding the operation of the present invention and is not to be construed as prior art with respect to the present invention disclosure.

PTDDC Background Application Context (0100)-(0800)

Prior patent applications and issued patents that are incorporated by reference within this patent application describe a hardware Pass-Thru Disk Drive Controller (PTDDC) technology that permits a string of serial advanced technology attachment (SATA) disk drives to be daisy-chained together to form a single logical disk drive. As generally depicted in FIG. 1 (0100) and FIG. 2 (0200), within this context, the disk drive chain contains an initial SATA interface that connects to the host bus adapter (HBA) of the host computer system (HCS) (0101, 0201). A PTDDC integrated circuit (IC) or applications specific integrated circuit (ASIC) implements protocols along the daisy-chain to pass data up/down the daisy-chain as required by the host computer system (HCS) (0101, 0201). The PTDDC may be implemented as a 4-port device (0110, 0190) as depicted in FIG. 1 (0100) having HBA I/O port (0111, 0191), SATA disk drive interface (DDI) port (0112, 0192), pass-thru input (PTI) port (0113, 0193), and pass-thru output (PTO) (0114, 0194). The PTDDC may be also be implemented as a 3-port device (0210, 0290) as depicted in FIG. 2 (0200) having SATA disk drive interface (DDI) port (0212, 0292), pass-thru input (PTI) port (0213, 0293), and pass-thru output (PTO) (0214, 0294), wherein the HBA port (0111, 0191) and PTI (0113, 0193) ports have been functionally merged. In both examples provided the ports depicted are configured as SATA hardware ports that may incorporate additional protocols implementing the functions described herein. An example of the PTDDC daisy-chain implemented on using individual disk drives that are sequentially connected in a daisy-chain is generally depicted in FIG. 3 (0300). An example of the PTDDC daisy-chain (0410) implemented on an active backplane using application specific integrated circuits (ASICs) (0411, 0412, 0413, 0414, 0415) is generally depicted in FIG. 4 (0400) with the system incorporating installed disk drives as depicted in FIG. 5 (0500). As generally illustrated in FIG. 5 (0500), the PTDDC daisy-chain may only be partially filled with physical storage, even though the logical array size may be much larger than that which is physically present. A PTDDC-enabled integrated backplane suitable for incorporating a number of disk drives in a daisy-chain is generally depicted in FIG. 6 (0600) and is shown populated with disk drives, power supply, and spare slot inserts in FIG. 7 (0700). These double-sided storage backplanes as depicted in FIG. 7 (0700) may be integrated in to petabyte-class (1000 terabyte) storage racks as generally depicted in FIG. 8 (0800).

One objective of the PTDDC storage array as discussed above is to drastically reduce the overall interconnect costs between disk drives in a storage array by minimizing the cost of the hardware required to provide drive interconnection into a larger logical storage array context. As mentioned in the incorporated patents and patent applications, while the individual disk drive cost in a storage array may approach USD$25, the average cost of the same drive when combined with computer server, power supply, and overhead interconnects typically ranges from USD$1000-USD$3000 in a typical commercial storage array system that integrates the individual disk drives into a unified storage array. Thus, for a petabyte-class (1000 terabyte) storage array, implementation costs typically range from USD$1M-USD$3M, when the drive costs would be approximately USD$25000, meaning that interconnect coats in typical server arrays consume approximately of the cost of the storage array. Thus, in commercial storage array systems, interconnect costs (rather than storage costs) dominate the cost profile of the overall system. The present invention targets cost reduction in the disk drive interconnection to reduce the overall cost of the storage array.

SATA/SAS Overview

SATA and SAS are two serial connections protocols between hosts and peripherals in desktops, servers, and other applications. The protocols are similar in terms of data rate and signal requirements but are targeted for slightly different applications. SATA is an evolution of the parallel ATA interface that was developed for use as an interconnect for desktop PCs, servers, and enterprise systems to connect a host system, to peripheral devices such as hard disk drives and optical storage drives. SATA systems are designed to operate in half-duplex mode-communication can only take place in one direction, at a time. The physical data rates for SATA are 1.5 Gbps, 3.0 Gbps, and 6.0 Gbps. SAS protocol is used as interconnect between disk drives and host controllers mainly in server systems. SAS is designed to be backwards compatible with SATA systems while offering more features-far more capacity, easier scalability and expansion, and enhanced security.

The SAS protocol is designed to operate in full-duplex mode-data can be transmitted and received to and from the drive simultaneously. The protocol supports connections with up to 8 m cables and can support the use of expanders that allow for connections of multiple SAS drives to a single host port. The physical data rates for SAS are 3.0 Gbps and 6.0 Gbps.

Hardware Interface Synchronization (0900)

Inherent in the implementation of the PTDDC daisy-chain presented in the patents and/or patent applications incorporated by reference in this document are the concepts of backward compatibility with existing SATA protocols and standards. As generally depicted in FIG. 9 (0900), this compatibility includes the hardware level where SATA protocols define how data is transferred between the host computer (0910) host bus adapter (HBA) (0911) and the local disk drive (LDD) (0920) disk drive interface (DDI) (0921). This hardware interface comprises four wires including two wires for differential transmit (TX) and two wires for differential receive (RX). Since the protocols transmitted on this TX/RX interface are serial in nature, there must be some form of frame synchronization that occurs between the transmitter and receiver to ensure that data commands and packets are properly synchronized between transmitter and receiver. This synchronization occurs at the hardware level and is termed out-of-band (OOB) signaling (OBS) in the SATA domain and will now be discussed in some detail to lay the foundation for discussion of the present invention.

SATA Physical Layer

The physical layer is the lowest layer of the SATA protocol stack. It handles the electrical signal being sent across the cable. The physical layer also handles some other important aspects, such as resets and speed negotiation. SATA uses low-voltage differential signaling (LVDS). Instead of sending 1's and 0's relative to a common ground, the data being sent is based on the difference in voltage between two conductors sending data. In other words, there is a TX+ and a TX− signal. A logic-1 corresponds to a high TX+ and a low TX− and vice versa for a logic-0. SATA uses a ±125 mV differential voltage swing. This scheme was chosen for multiple reasons. For one, it improves resistance to noise. A source of interference will likely affect both conductors in the same way, since they are parallel to each other. However, a change in voltage on both conductors does not change the difference between them, so the signal will still be easily recovered. Low voltage differential signaling also reduces electromagnetic interference (EMI), and the lower signaling voltages means that less power is used.

SATA OOB Signaling (1000)-(1200)

The physical layer is also responsible for host-device link initialization and resets. Since SATA devices and hosts always send data over differential channels, when it is idle (otherwise the link is considered lost), there has to be a way of recognizing a signal before a link has been initialized. For this SATA uses out-of-band signaling (OOB) to initialize a connection between a host and a device. The OOB mechanism supports low speed transmission over a high speed connection, such as a SATA link. The OOB signals are non-differential but are sent over a differential channel. This is possible by letting the differential transmitters drive their output pins to the same voltage, resulting in a reduced difference and when a preset threshold limit is reached the receiver can recognize the signal as OOB.

Under this scheme, it is assumed that the host and the device can detect the presence or absence of a signal, even if they cannot yet decode that signal. OOB signals are essentially that—whether or not an in-band signal is present. By driving TX+ and TX to the same common voltage (so not a logic 1 or a logic 0), one party can transmit an OOB "lack of signal." Link initialization is performed by sending a sequence of OOB primitives, which are defined patterns of signal/no-signal. These are detected using a register-based state machine as generally depicted in FIG. 10 (1000) that is designed to detect BURSTs and GAPs in the electrical state of the SATA hardware communication lines. There are three defined primitives: COMRESET (FIG. 11 (1100)), COMINIT (FIG. 12 (1200)), and COMWAKE (FIG. 13 (1300)). Each primitive consists of six "bursts" of a present signal, with idle time in between. The times of each burst are defined in terms of "Generation 1 Unit Intervals" (U), which is the time to send 1 bit at the SATA I rate of 1.5 Gb/s, or 666 ps. There are also fairly loose tolerances defined for each signal. Note that COMRESET (FIG. 11 (1100); and COMINIT (FIG. 12 (1200)) have the same definition and the only difference is that COMRESET is sent by the host, and COMINIT is sent by the device. The following table shows the definitions of the OOB signaling primitives.

| OOB Signal | Burst Length | Inter-burst Idle Time |
|---|---|---|
| COMRESET (FIG. 10) | 106 ns (160U) | 320 ns (480U) |
| COMINIT (FIG. 11) | 106 ns | 320 ns |
| COMWAKE (FIG. 12) | 106 ns | 106 ns |

The COMRESET signal, sent by the host, is used to reset the link. Following a COMRESET, the OOB initialization sequence is performed again. COMRESET can also be sent repeatedly to hold the link in a reset state.

SATA OOB Sequence (1400)-(1600)

The initialization state machine for the host follows the sequence depicted in FIG. 14 (1400) and FIG. 15 (1500) to establish communications with the disk device. First, a COMRESET is sent. The host then waits for a COMINIT from the device. If no COMINIT is received, the host can send more COMRESETs until it receives one, and assume that no device is connected until it does. After receiving COMINIT, the host is given time to optionally calibrate its receiver and transmitter. For example, it may be necessary to adjust signal parameters or termination impedances. The host then sends a COMWAKE to the device, and expects the same in return. After this, the host waits to receive an ALIGN primitive (an in-band signal which will be explained shortly). Meanwhile, it sends a "dial-tone" to the device: an alternating pattern of 1's and 0's. This was intended as a cost-saving feature, so that disks with cheap oscillators could instead use the dial-tone as a reference clock for clock phase locking.

As can be seen in FIG. 11 (1100)-FIG. 13 (1300) there are three types of (actually two since COMINIT and COMRESET are equal) valid OOB signals where bursts of six ALIGNP are sent with different timing. The importance in the signaling lies in the timing, it does not really matter if an ALIGNP or something else is sent because the receiver only detects the drop of voltage difference between RX+ and RX−. In FIG. 16 (1600) the complete startup sequence is visualized and the calibration steps in it are optional to implement. The host sends COMRESET until the device is powered on and can respond with a COMINIT. Upon reception of the COMINIT the host sends a COMWAKE to the device which shall send a COMWAKE back.

If this procedure is finished within a correct time the OOB signaling ends and the differential communication can proceed with determining the link speed (right part of the FIG. 16 (1600)). It is at this stage that speed negotiation is performed. The device will send ALIGN primitives at the fastest speed it supports, and wait for the host to acknowledge them. If it does not receive an acknowledgment, then it tries the next lowest speed, and so on until an agreement is found. Alternatively, if the host supports faster speeds than the device, then ALIGN primitives it receives will appear "stretched" and the host can then slow down to accommodate. When the host receives valid ALIGN primitives, it sends ALIGNS back to acknowledge. Both parties then send SYNC or other non-ALIGN primitives, and the link is ready for data transmission operations.

PRIOR ART LIMITATIONS AND INVENTION OBJECTIVES

It must be stressed in the discussion of the present, invention that, the prior art imposes a number of relatively severe limitations on handling disk drives that include:
  Prior art disk drive systems do not permit daisy-chaining of disk drive storage.
  Prior art disk drive systems do not permit logical concatenation of disk drive storage at the hardware level and require operating system software to accomplish this task.
  Prior art disk drive systems incorporate significant overhead in concatenating physical disk drive storage into a larger logical disk drive volume.
  There is no current hardware or methodology available to logically concatenate a number of disk drives together yet allow for incremental increases in storage capacity without reformatting of critical data structures (CDS) within a storage array.
  Prior art disk drive systems incorporating SATA protocols do not support daisy-chaining of OBS signaling control protocols,
  Prior art disk drive systems incorporating SATA protocols do not support synchronization of disk drives connected in a daisy-chain.

These limitations are inconsistent with the use of daisy-chained PTDDC logical disk volumes in some circumstances. It is the objective of the present invention to overcome these limitations.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention addressed the deficiencies of the prior art by implementing a register-based state machine (RSM) that coordinates operation of individual state machines controlling the operation of the PTI, PTO, and DDI ports in a PTDDC daisy-chain incorporating locally attached disk drives (LDDs). The RSM controls the sequencing of OBS within the PTI, PTO, and DDI ports to ensure that the entire string of daisy-chained LDDs is properly synchronized both upstream and downstream in the daisy-chain.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
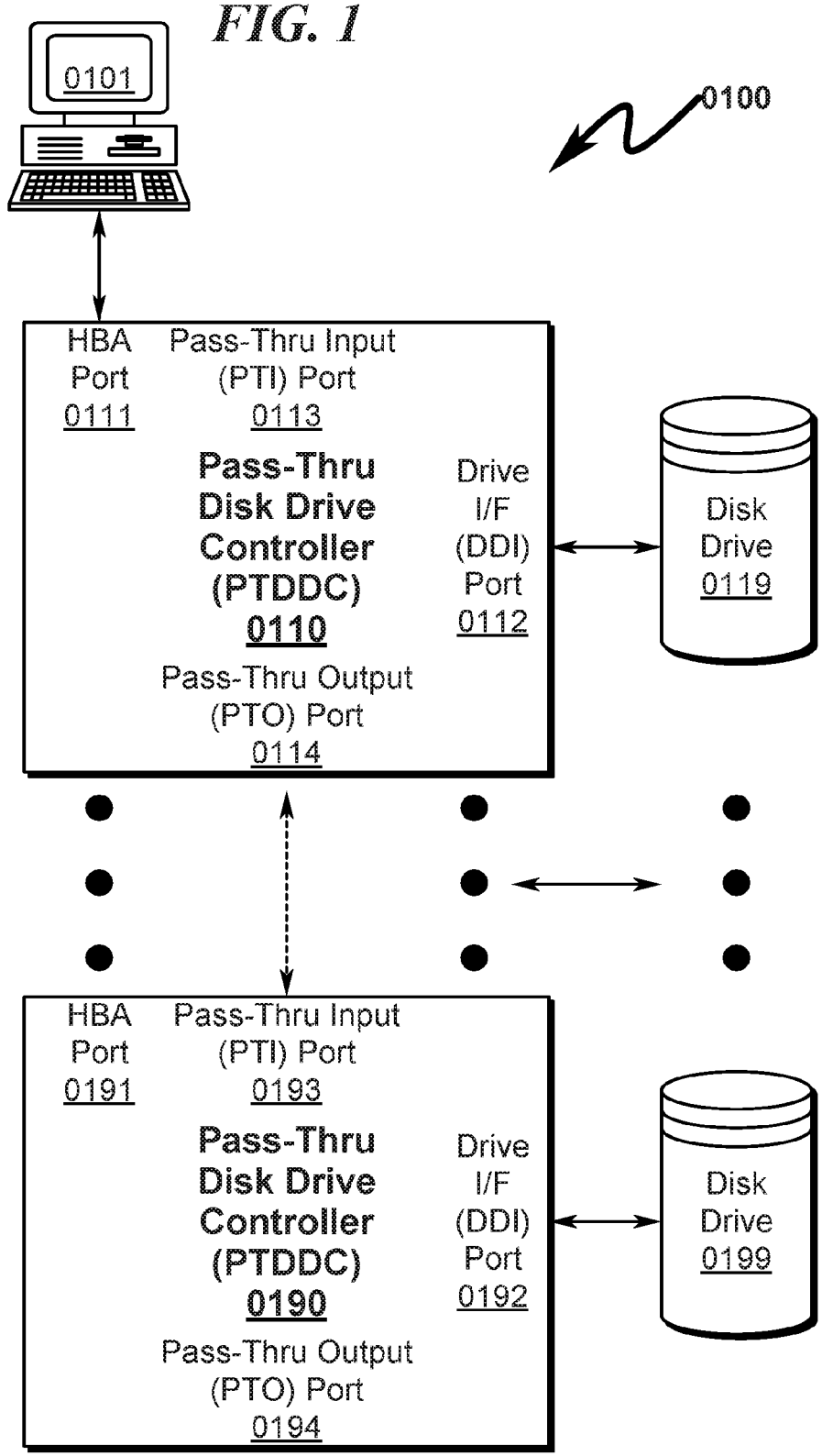
FIG. 1 illustrates a general system block diagram illustrating a preferred exemplary embodiment of a PTDDC daisy-chain incorporating HBA, PTI, PTO, and DDI SATA ports.
Figure 2:
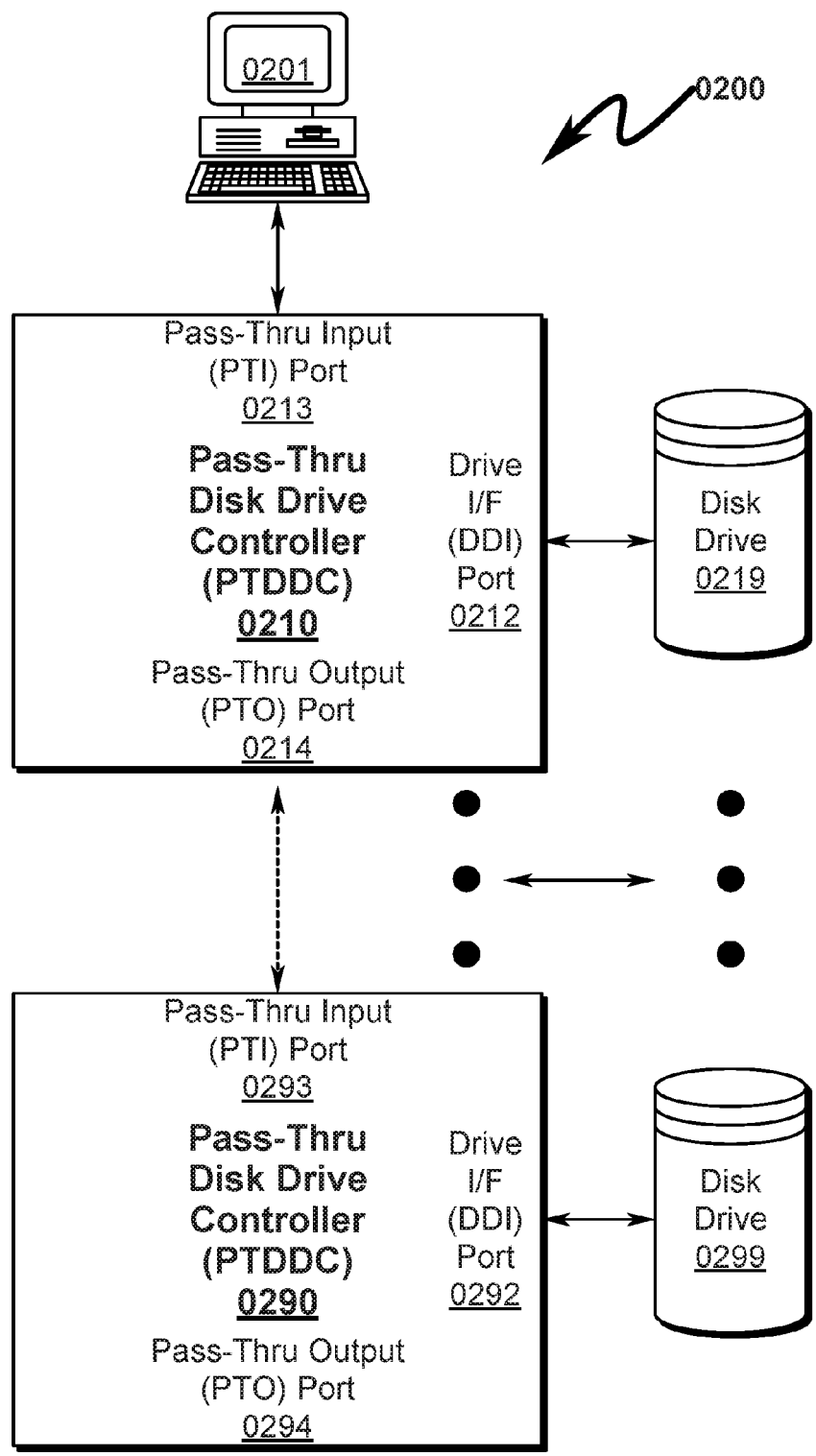
FIG. 2 illustrates a general system block diagram illustrating a preferred exemplary embodiment of a PTDDC daisy-chain incorporating PTI, PTO, and DDI SATA ports.
Figure 3:
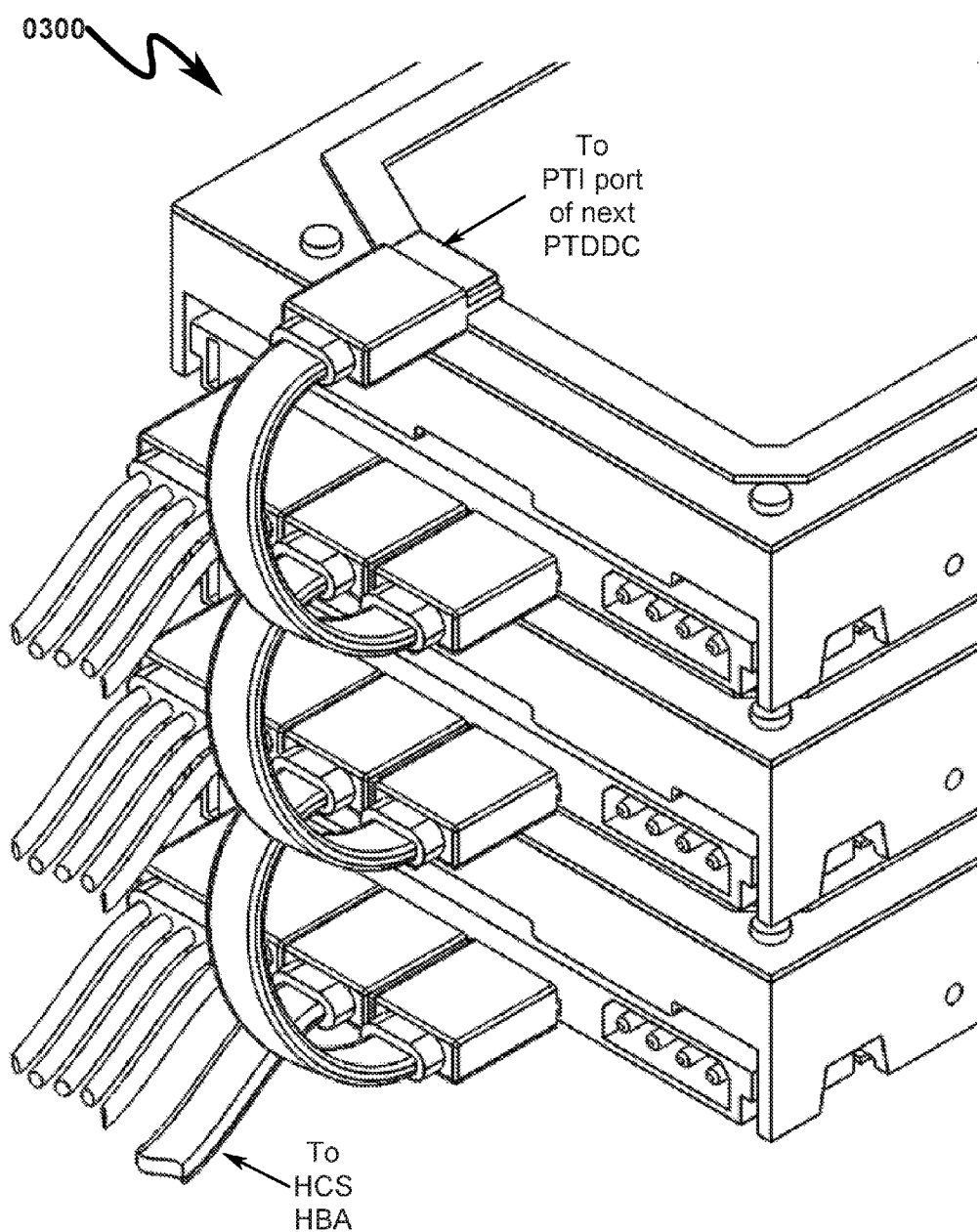
FIG. 3 illustrates a top right front perspective view of a PTDDC daisy-chain implemented with discrete SATA cables.
Figure 4:
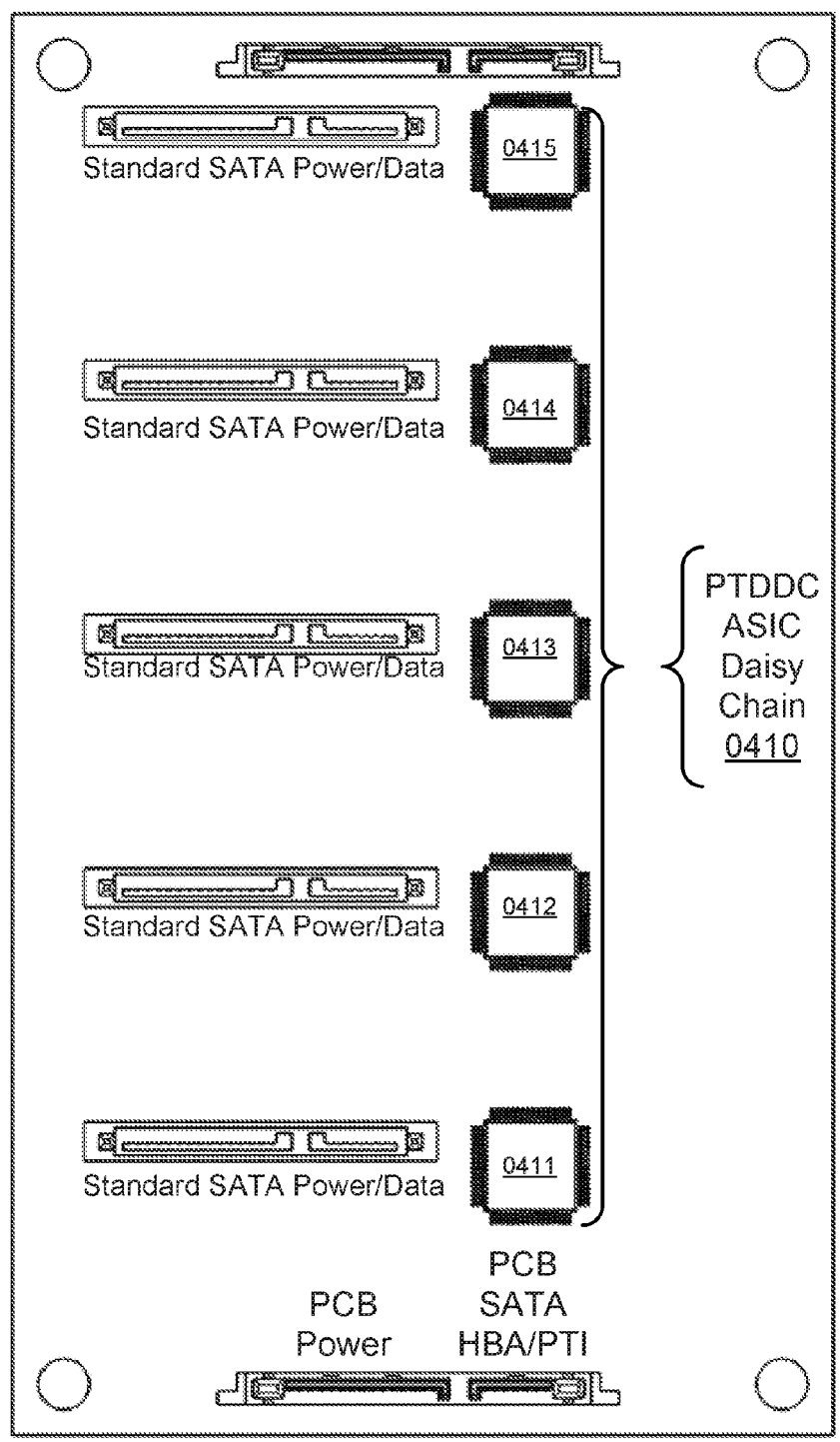
FIG. 4 illustrates a front view of a PTDDC active PCB backplane with detail of a modified SATA interface connector.
Figure 5:
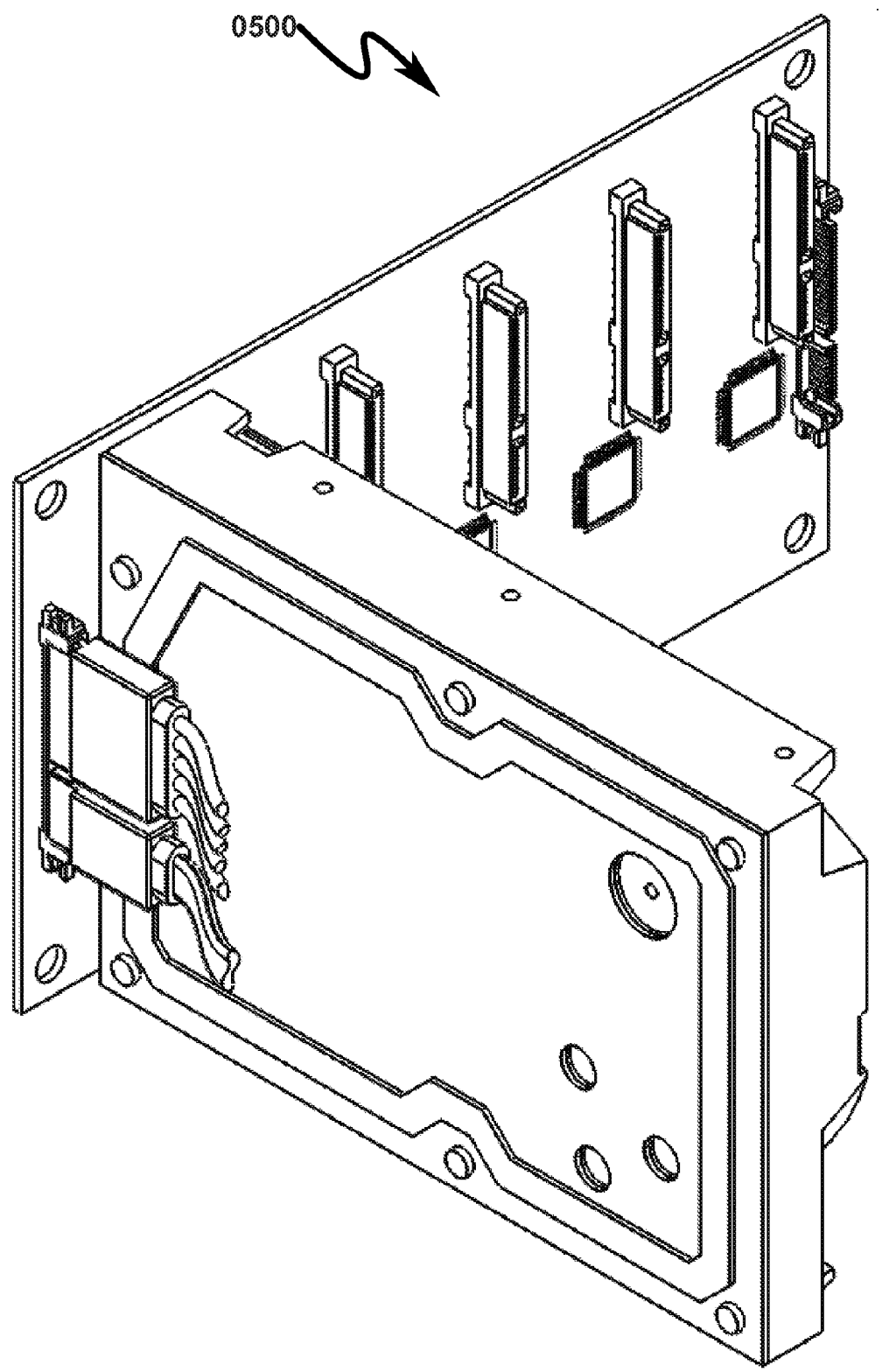
FIG. 5 illustrates a front left perspective view of a PTDDC active PCB backplane with a PTDDC-enabled SATA disk drive inserted into the PCB backplane (partially filled virtual storage)
Figure 6:
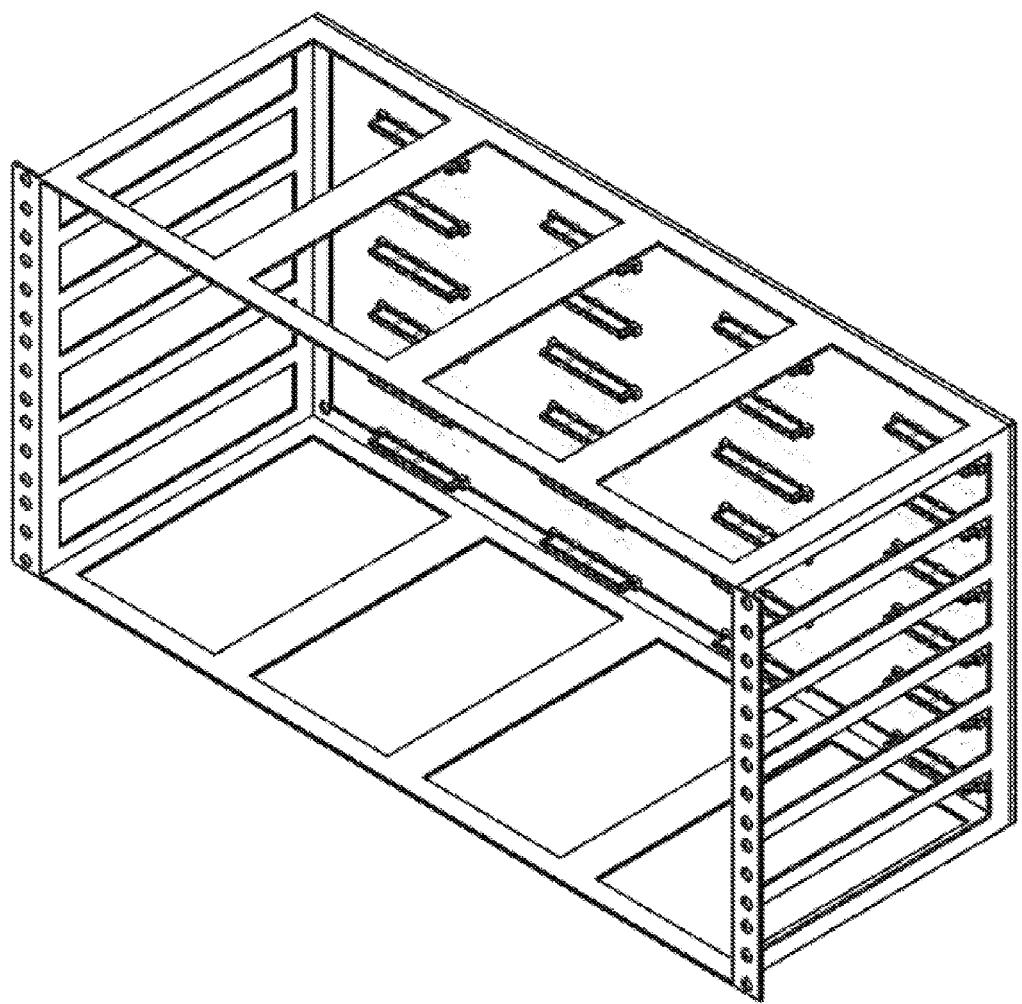
FIG. 6 illustrates an empty rack/backplane integrated subassembly implementing a PTDDC daisy-chain.
Figure 7:
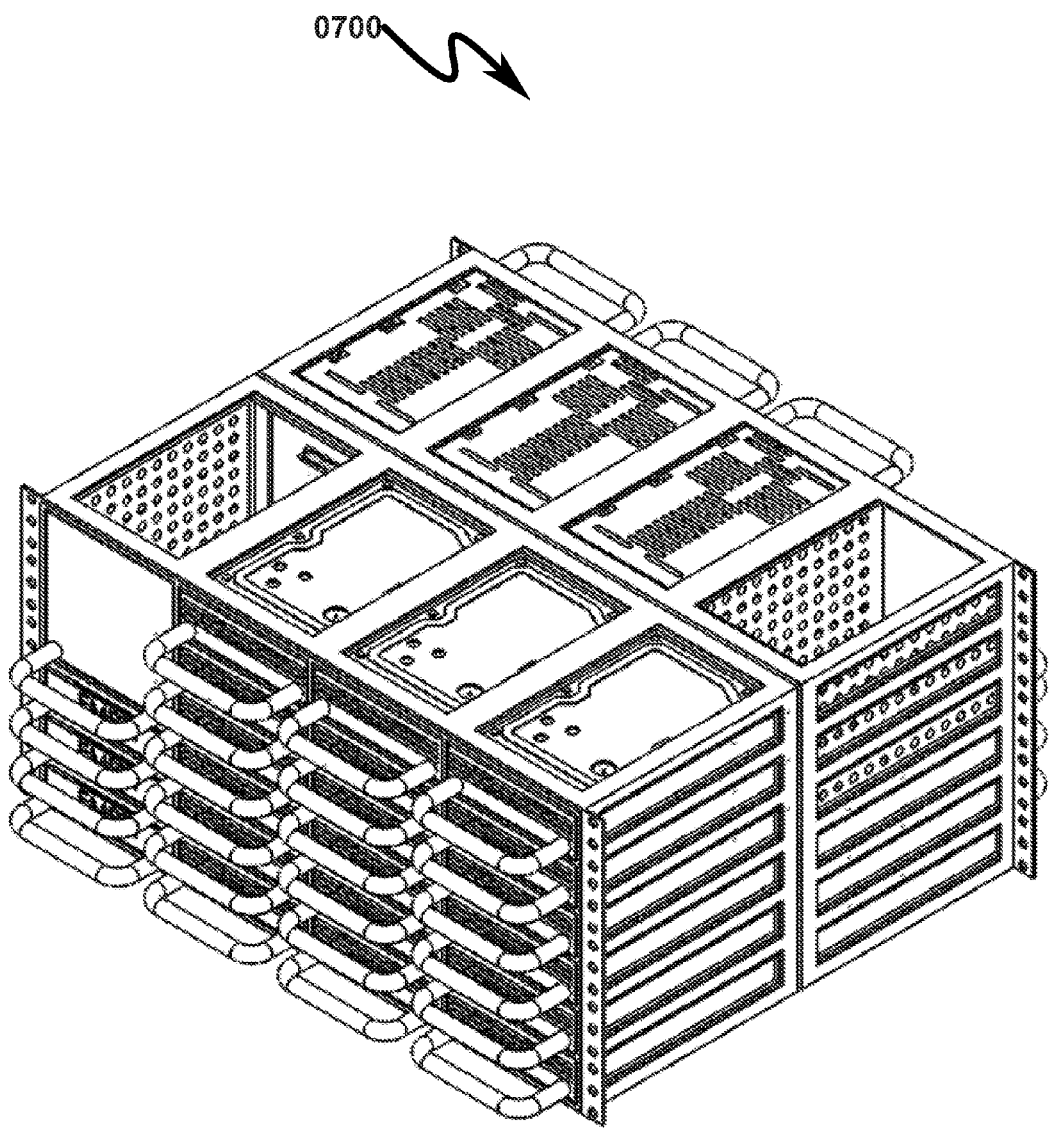
FIG. 7 illustrates a populated rack/backplane integrated subassembly implementing a PTDDC daisy-chain.
Figure 8:
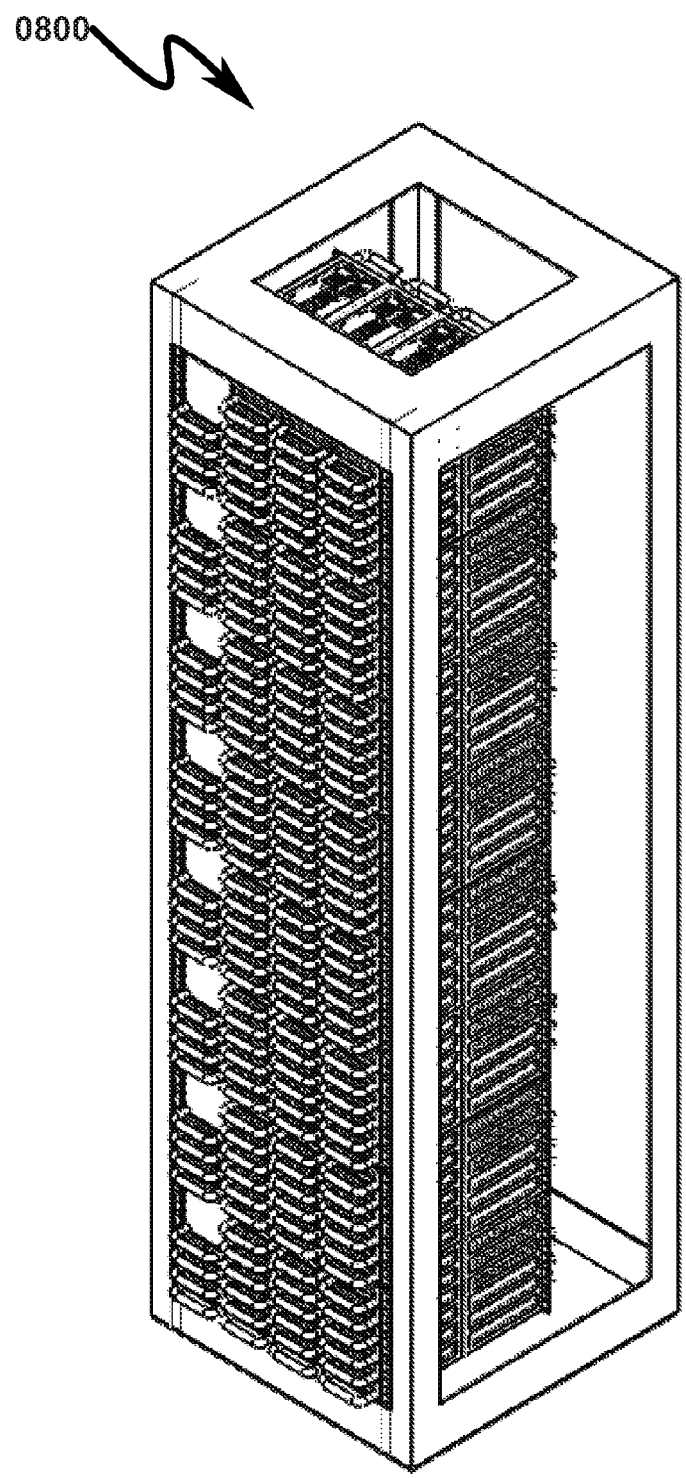
FIG. 8 illustrates a populated storage system implementing a large-scale petabyte-class PTDDC daisy-chain.
Figure 9:
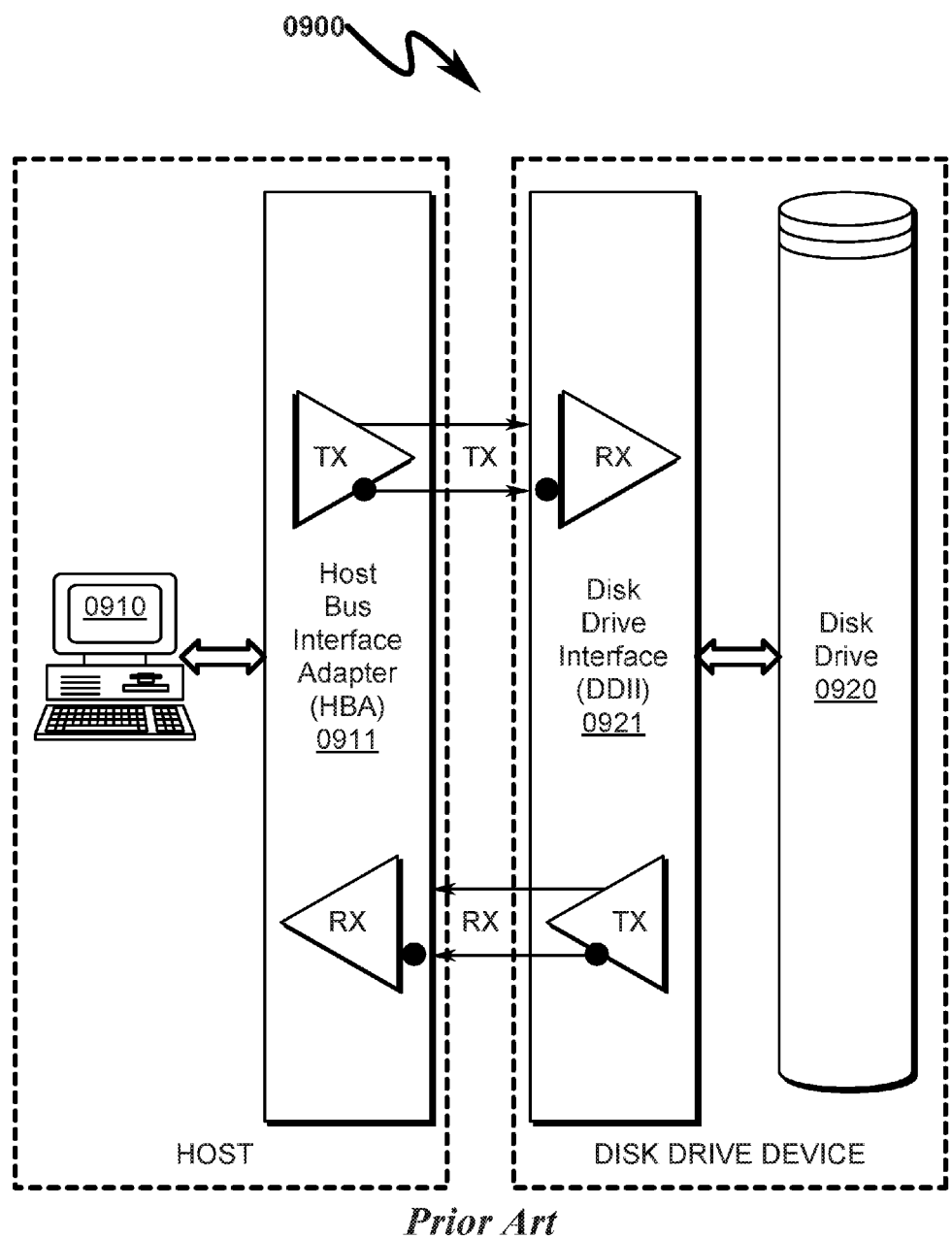
FIG. 9 illustrates prior art SATA serial hardware interface logic.
Figure 10:
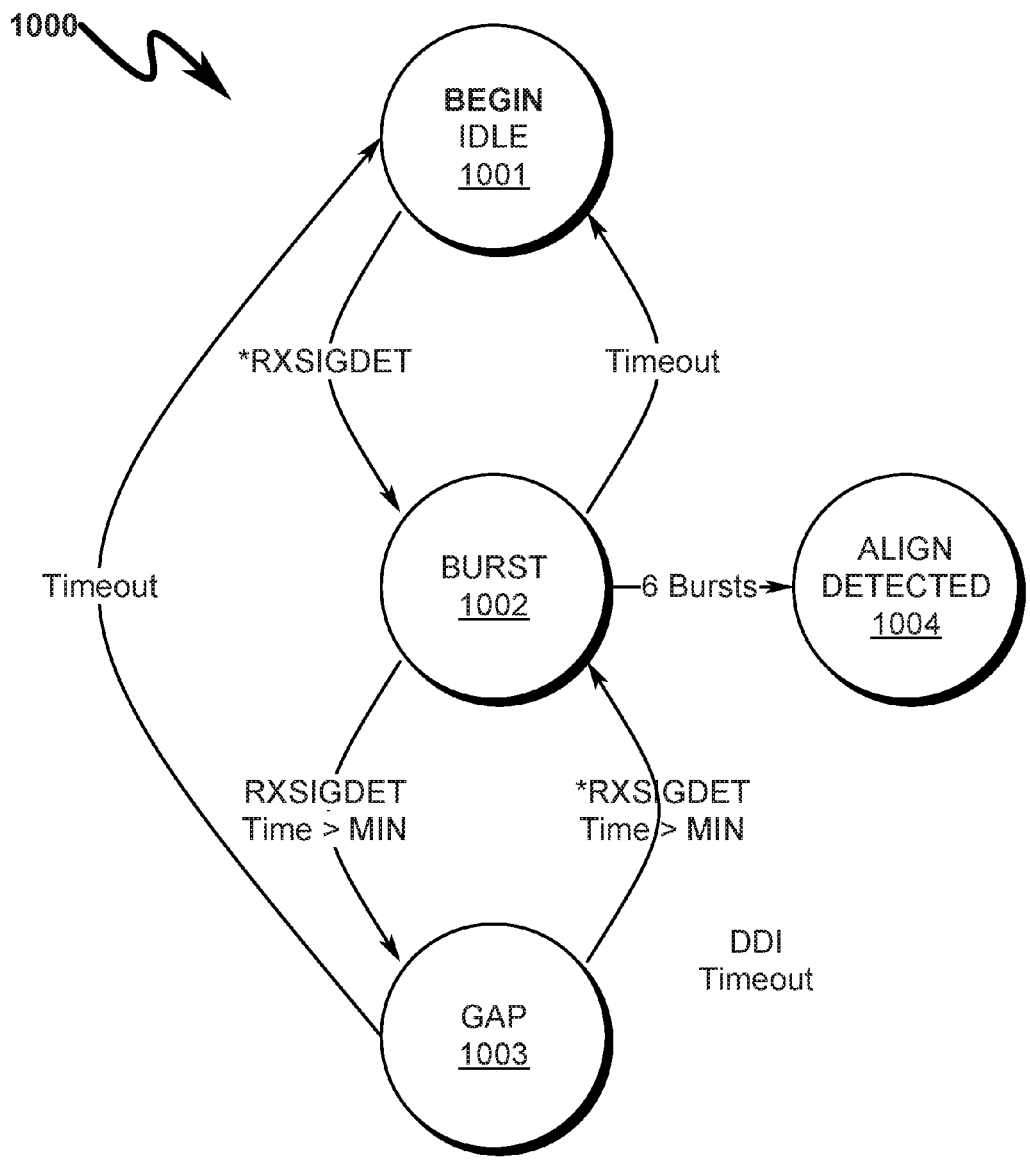
FIG. 10 illustrates a prior art GOB primitive detection state machine.
Figure 11:
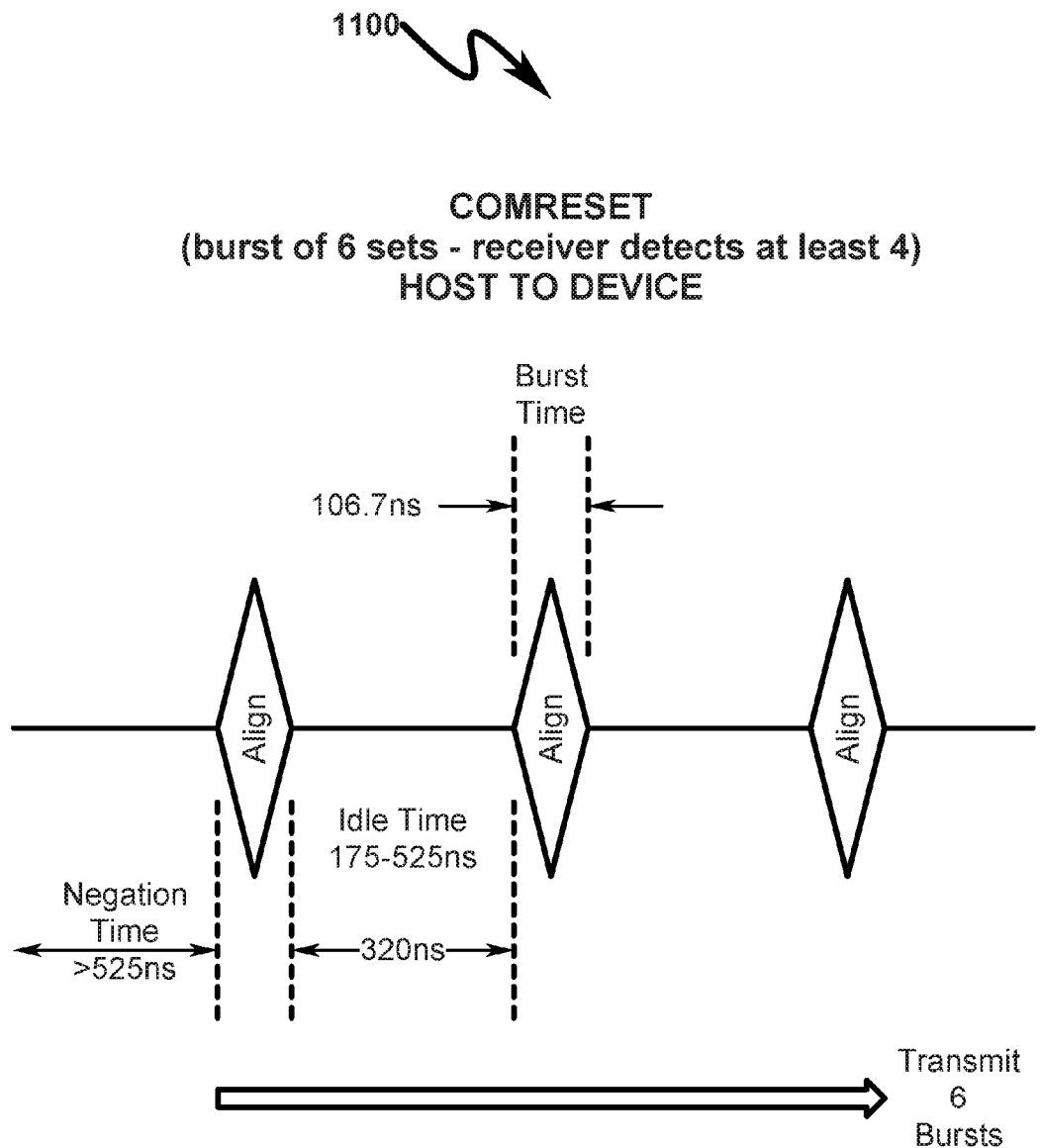
FIG. 11 illustrates prior art SATA COMRESET signal timing.
Figure 12:
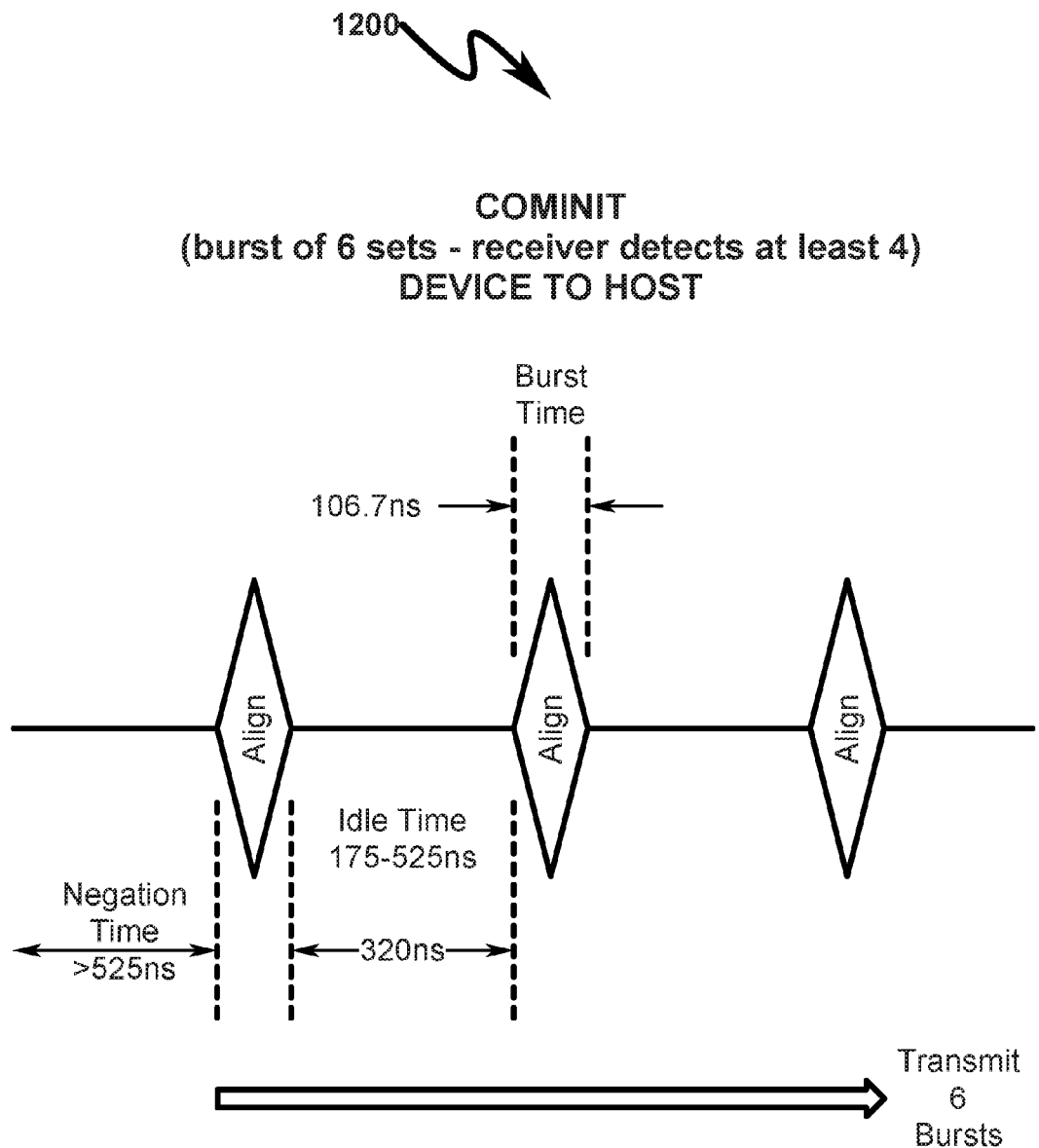
FIG. 12 illustrates prior art SATA COMINIT signal timing.
Figure 13:
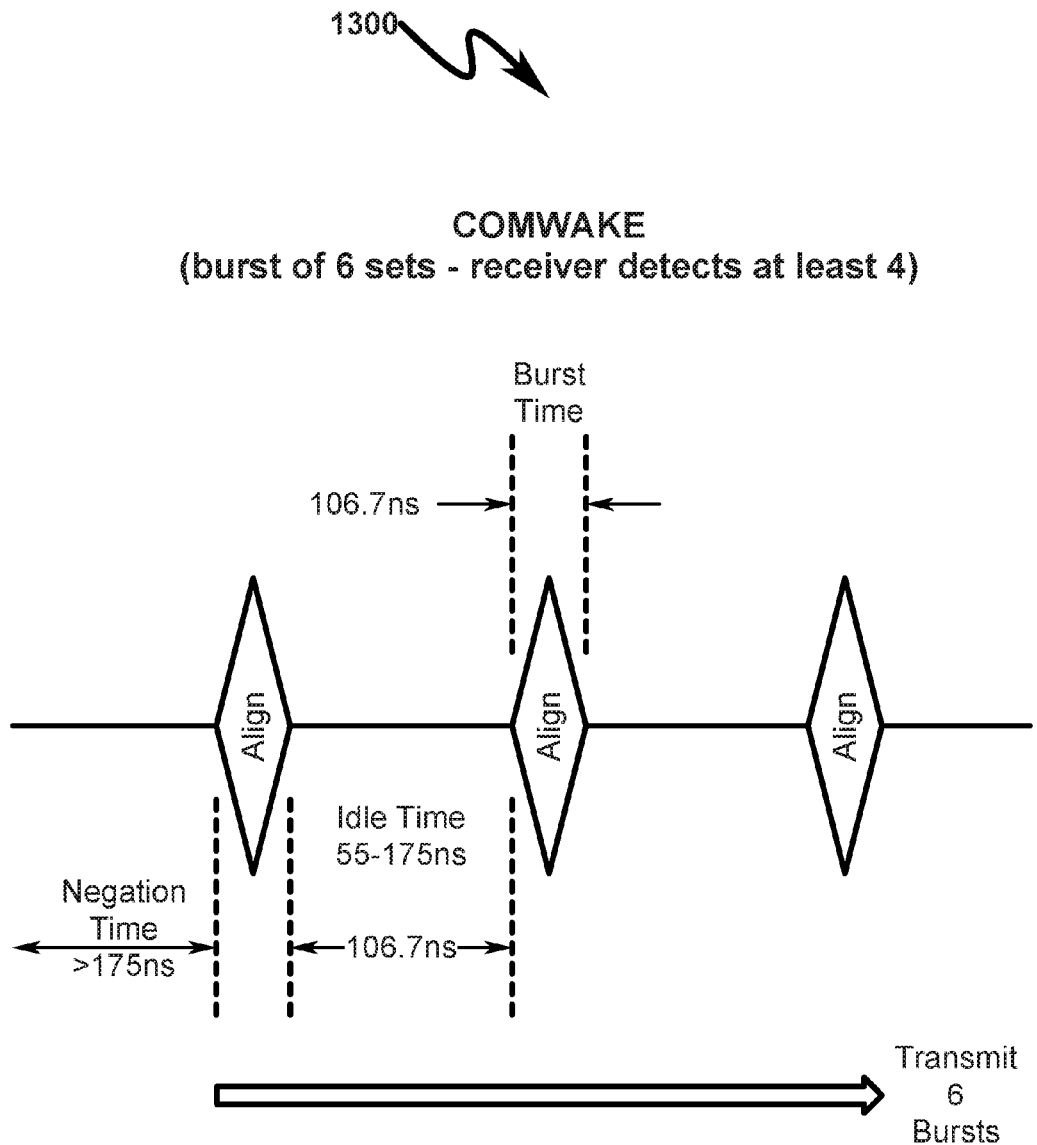
FIG. 13 illustrates prior art SATA COMWAKE signal timing.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present, application will be described with particular reference to the presently preferred embodiment, wherein these innovative teachings are advantageously applied to the particular problems of a DAISY-CHAIN STORAGE SYNCHRONIZATION SYSTEM MID METHOD. However, it should be understood that this embodiment is only one example of the many advantageous uses of the innovative teachings herein. In general, statement s made in the specification of the present application do not necessarily limit any of the various claimed inventions. Moreover, some statements may apply to some inventive features but not to others.

Disk Drive not Limitive

Within the present application the term "disk drive" and its equivalents may relate to traditional, spinning spindle platter-type disk drive storage as well as other forms of storage such as solid state disk drives. While the techniques taught by the present invention have high applicability to disk drives having a serial advanced technology attachment (SATA) interface, it is equally applicable to other disk drive interface types.

SATA Interference not Limitive

Within the present application the term "SATA interface" and its equivalents may relate a wide variety of SATA serial disk drive interfaces. Variants of the SATA interface include 1.5 Gb/s (SATA 1.0), 3 Gb/s (SATA 2.0), 6 Gb/s (SATA 3.0), 16 Gb/s (SATA 3.2) and other speed variants, but may also include variants such as SATAe (SATA EXPRESS). Generally speaking, a SATA interface in this context may be any serially attached disk drive, interface and may include disk drives serially connected using PCI/PCIe interfaces.

SATA Mechanical Interface not Limitive

While the exemplary invention embodiments depicted herein may utilize standard SATA mechanical dimensions for power and/or signal connectors, the present invention is not limited to these particular mechanical examples, and may include a variety of other SATA mechanical interfaces including mini and micro style connectors. Appropriate scaling of the mechanical examples provided herein is within the expertise of one of ordinary skill in the electrical/mechanical arts.

HBA/DDI Port not Limitive

The present invention may be applied to a wide variety of disk drive storage systems incorporating a wide variety of host bus adapter (HBA) and disk drive interface (DDI) physical hardware interfaces. While many preferred embodiments may be configured wherein the HBA and DDI are of the same type of physical hardware interface, the present invention is not limited to this configuration, and the HBA and DDI may be of any disparate type of hardware interface.

PTI/PTO Port not Limitive

The present invention may be advantageously configured in some situations where the pass-thru input (PTI) port and pass-thru output (PTO) port are of the same hardware configuration as the HBA interface, but the present invention does not require this conformity.

Host Bus Adapter (HBA) not Limitive

The present invention may be applied to a wide variety of disk drive storage systems incorporating a wide variety of host bus adapter (HBA) interfaces. Generally speaking, the HBA interface may vary widely among current disk drive subsystems as well, as enhancements and/or replacements to these interfaces that may occur in the future. The present invention, while suitable for many current and future HBA interfaces, is particularly suitable for implementation using parallel ATA (PATA/PATAPI) (also identified as IDE/EIDE), serial ATA (SATA/SATAPI/eSATA/microSATA), Fibre Channel, Serial Storage Architecture (SSA), and universal serial bus (USB) interfaces. Thus, the present invention, while not limiting the scope of the HBA used with the system, may be implemented in some preferred exemplary embodiments using one or more of the HBA interfaces listed.

Many preferred exemplary embodiments utilize the serial ATA (SATA) disk drive interface standard. This standard, available from the Serial ATA International Organization (www.sata-io.org), is hereby incorporated by reference in this document.

OOB/OBS Synonymous

Within this document the terms out-of-band (GOB) and out-of-band signaling (OBS) will be used synonymously.

Compatibility With Port Multipliers/Port Selectors

The present invention as exemplified by the PTDDC SDD remapping concept is totally compatible with existing port multiplier/port selector techniques described in the SATA specification. This compatibility permits rapid integration of the present invention into "cloud" computing environments where vast arrays of data storage are implemented for the support of a plethora of computers and associated computer users. The advantage of the present invention as implemented in these environments is a significant cost reduction in overall data storage costs at the enterprise level as compared to the prior art and detailed below.

PTDDC OBS State Machine (1700)

Figure 17:
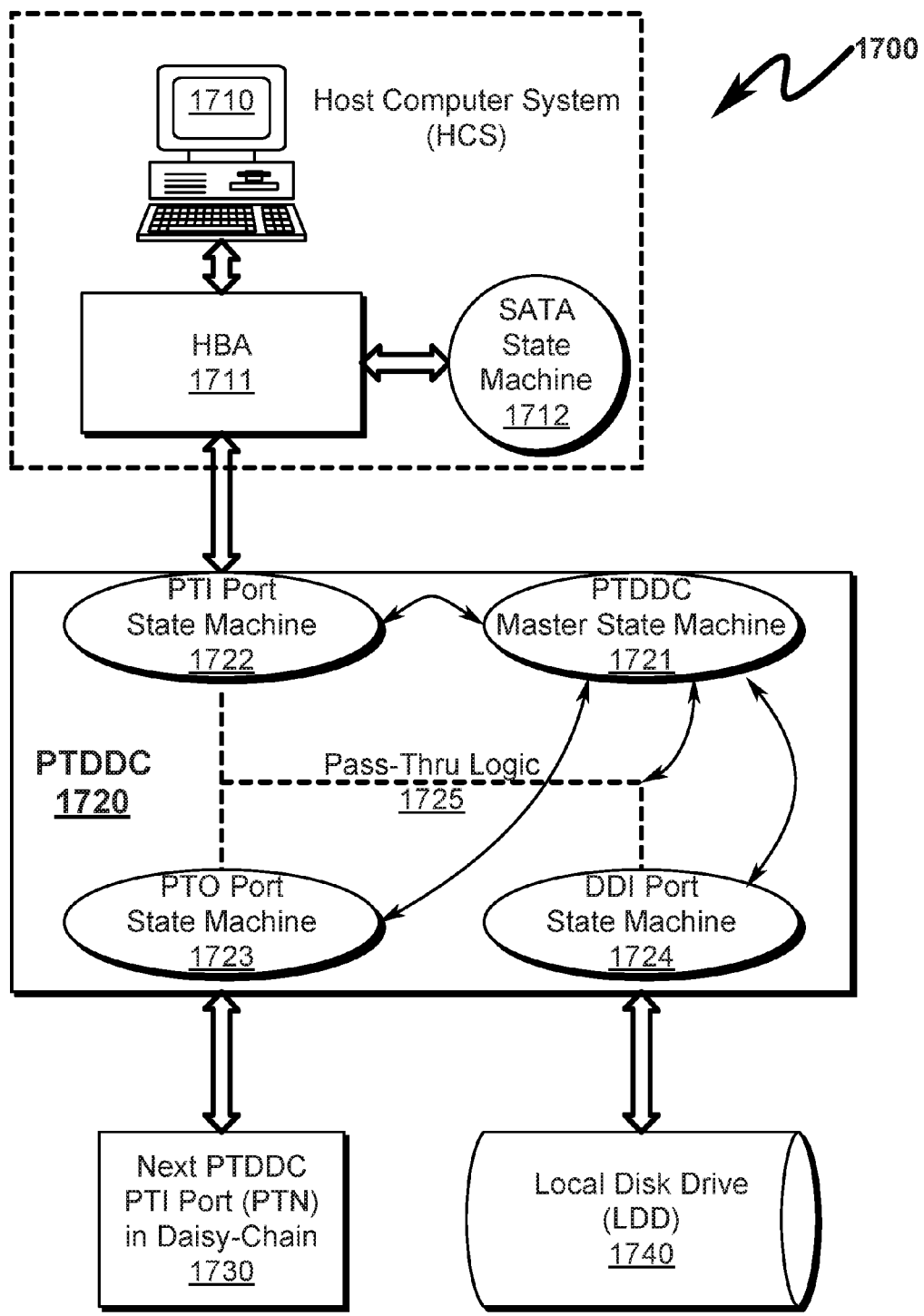
FIG. 17 illustrates a block diagram of a preferred exemplary invention system embodiment depicting OBS state machine interaction within the system.

An overview of the OBS RSM state machine logic functionality as taught by the present invention is generally depicted in FIG. 17 (1700), wherein a host computer system (HCS) (1710) communicates with a PTDDC (1720) that is daisy-chained to a downstream PTDDC (1730) and locally attached via SATA cable to a local disk drive (LDD) (1740). Within the context of the depicted system block diagram, the state machines (1712, 1722, 1723, 1724) may be implemented as register-based hardware state machines or programmable logic depending on application context. Thus, each of the PTI, PTO, and DDI ports may incorporate their own independent handshaking between the respective devices (HBA-PTI, PTO-PTN, and DDI-LDD), and also operate at different communication speeds depending on the negotiated SATA communication speed between the devices (HBA-PTI, PTO-PTN, and DDI-LDD).

From the perspective of the HCS (1710), the PTDDC (1720) appears as a traditional SATA disk drive and as such the HCS (1710) host, bus adapter (HBA) (1711) can communicate with the PTDDC (1720) using a standard SATA protocol state machine (1712) that incorporates SATA-standard OBS COMRESET/COMINIT/COMWAIT protocols communicating with the PTDDC PTI port state machine (1722). Similarly, the local disk drive (LDD) (1740) can communicate with the DDI port state machine (1724) using standard SATA OBS COMRESET/COMINIT/

COMWAIT protocols. The next PTDDC (1730) may also communicate with the PTDDC (1720) using SATA-standard OBS COMRESET/COMINIT/COMWAIT protocols. Note that each of these port state machines (1722, 1723, 1724) is under operational control of an internal master PTDDC state machine (1721) that control operation of these port-based state machines as well as the pass-thru logic (1725) within the PTDDC (1720).

PTDDC OBS Power-Up Sequencing (1800)-(2400)

The PTDDCs within the daisy-chain are configured to individually maintain drive state information (DSI) relating to the LDD as well as chain state information (CSI) relating to the individual PTDDC within the daisy-chain as generally depicted in FIG. 17 (1700). This state information may be modified on receipt of out-of-band signaling (OBS) from other PTDDC elements up the daisy-chain as well as OBS from other PTDDC elements down the daisy-chain. CSI is determined in part by conventional SATA OBS state register protocols that are modified by internal state registers (ISR) in each individual PTDDC daisy-chain element so as to make the DSS transparent to existing SATA OBS single-disk standard hardware command protocols.

PTDDC OBS State Machine Overview (1800)

Figure 18:
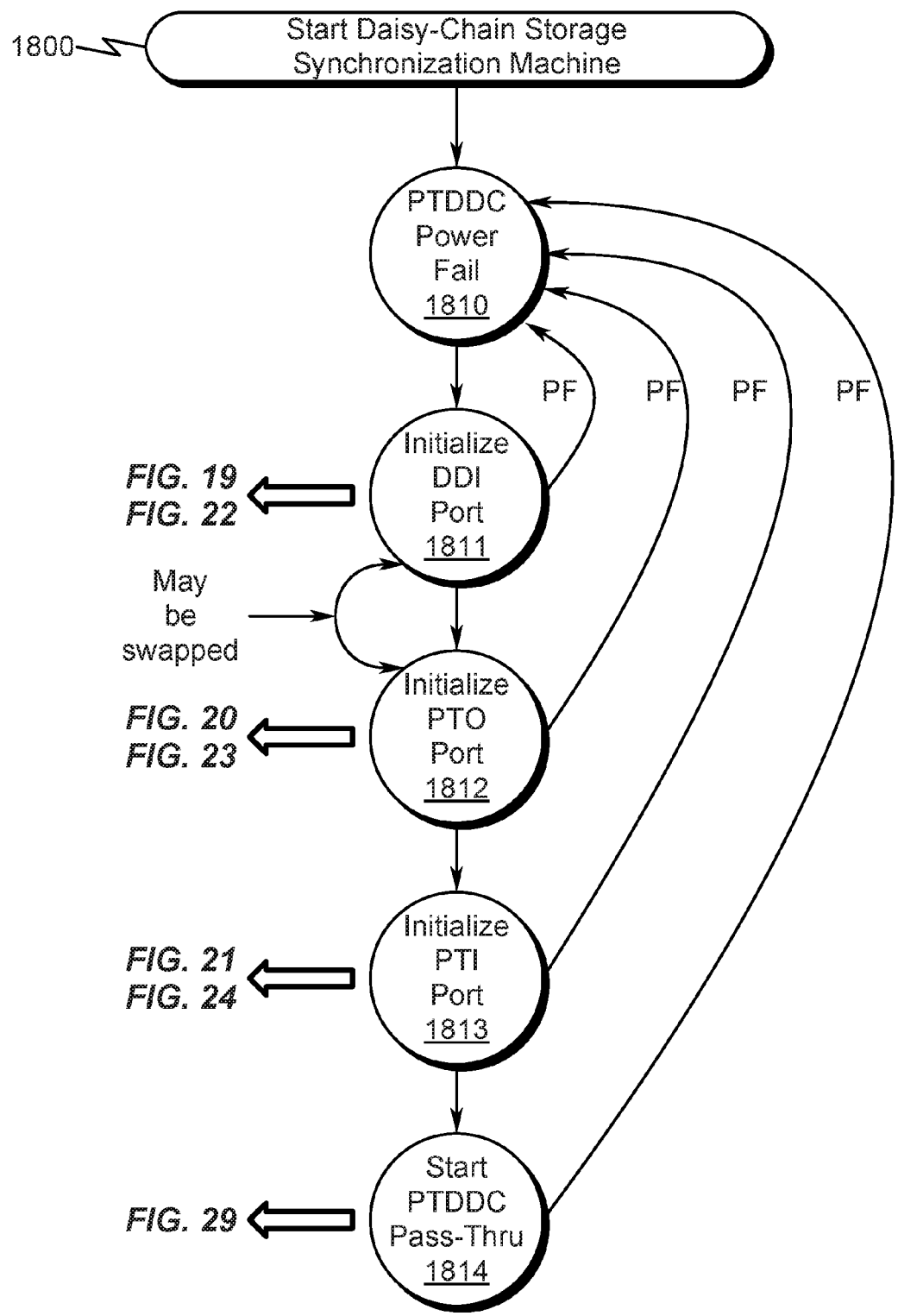
FIG. 18 illustrates RSM state machine sequencing within a preferred exemplary invention system embodiment.

As generally illustrated in FIG. 18 (1800), the PTDDC coordinates operation of the PTI, PTO, and DDI ports so as to synchronize operation of the daisy-chain. The state overview depicted in FIG. 18 (1800) begins with a power-fail state (1810) which is entered when power is first applied to the PTDDC or if a power-fail condition is detected within the PTDDC hardware logic. This state is then traversed to the DDI port initialization state (1820) which communicates with the local DDI port and coordinates its operation via a separate OBS method protocols and state machine information depicted in FIG. 19 (1900) and FIG. 22 (2200). Once the DDI port has been initialized, the downstream PTO port is initialized (1830) according to OBS method protocols and state machine information depicted in FIG. 20 (2000) and FIG. 23 (2300). Note that the DDI port initialization state (1820) and the PTO port initialization state (1830) may be swapped in some embodiments. Finally, the PTI port is initialized (1840) according to OBS method protocols and state machine information depicted in FIG. 21 (2100) and FIG. 24 (2400) to communicate with upstream PTDDC controllers and/or a host bus adapter (HBA). Once the PTI port has been initialized, the internal PTDDC pass-thru logic is activated (1850) to translate read/write LBA requests within the daisy chain as necessary to the appropriately mapped DDI port and locally attached disk drive (LDD).

DDI Port Synchronization method Implementation (1900)/ (2200)

Figure 19:
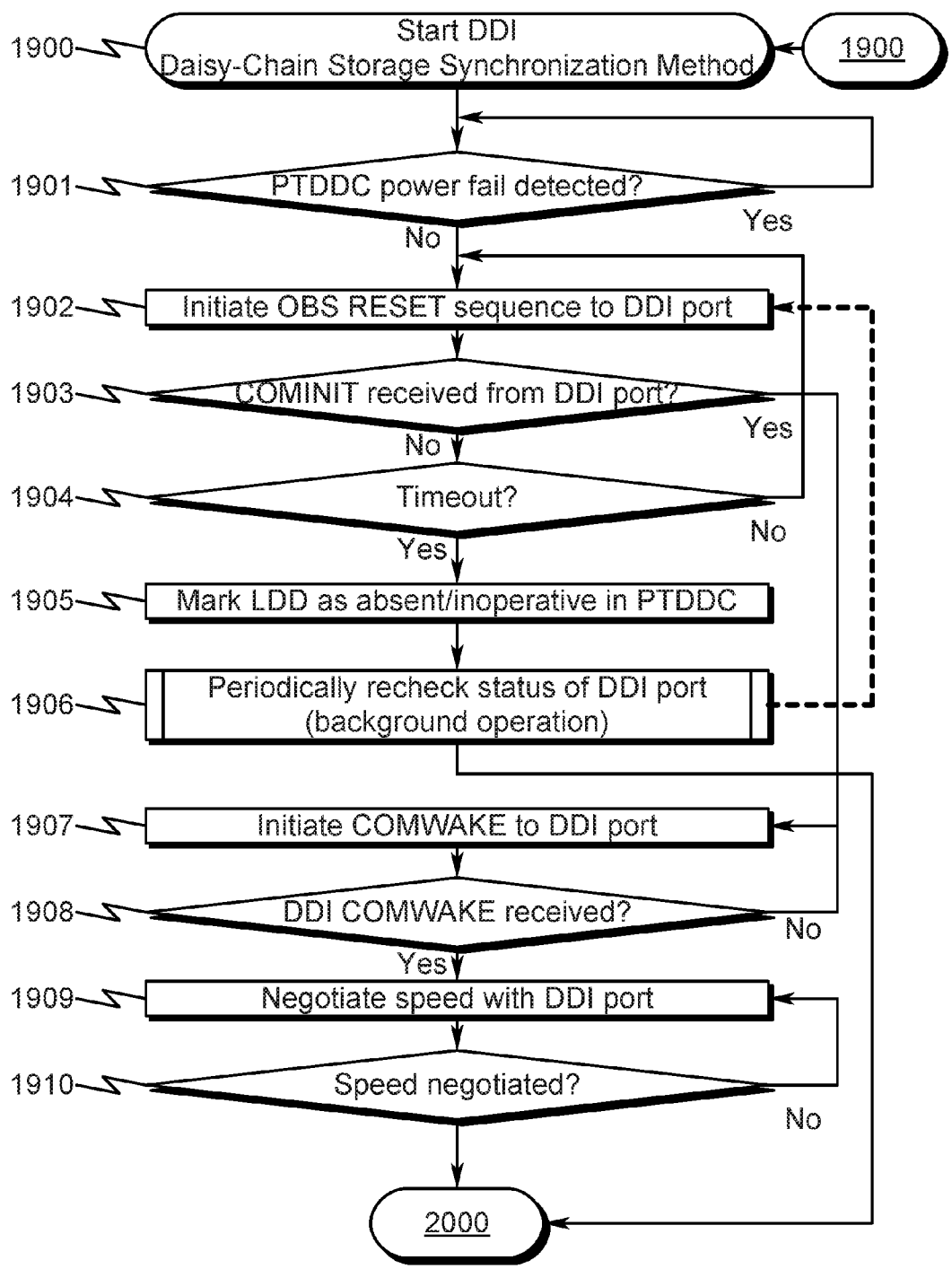
FIG. 19 illustrates a flowchart depicting a preferred exemplary invention method embodiment that synchronizes the PTDDC DDI port.

A general overview of the DDI daisy-chain storage synchronization method is depicted in the flowchart of FIG. 19 (1900) and includes the following steps:
(1) Determine if a power fail condition has been met, and if so, proceed to step (1) (1901);
(2) Initiate an OBS reset sequence to the DDI port (1902);
(3) Determine if a COMINIT has been received from the DDI port, and if so, proceed to step (7) (1903);
(4) Determine if the DDI port has timed out, and if not, proceed, to step (2) (1904);
(5) Mark the LDD has absent/inoperative in the PTDDC (1905);
(6) Periodically recheck the status of the DDI port as a background operation, and proceed to terminate DDI port initialization (1906);

(7) Initiate an OBS COMWAKE to the DDI port (1907);
(8) Determine if a COMWAKE has been received from the DDI port, and if not, proceeding to step (7) (1908);
(9) Negotiate transmit/receive communication speed with the LDD attached, to the DDI port (1909);
(10) Determine if proper speed has been negotiated, and if not, proceeding to step (9) (1910).

Figure 22:
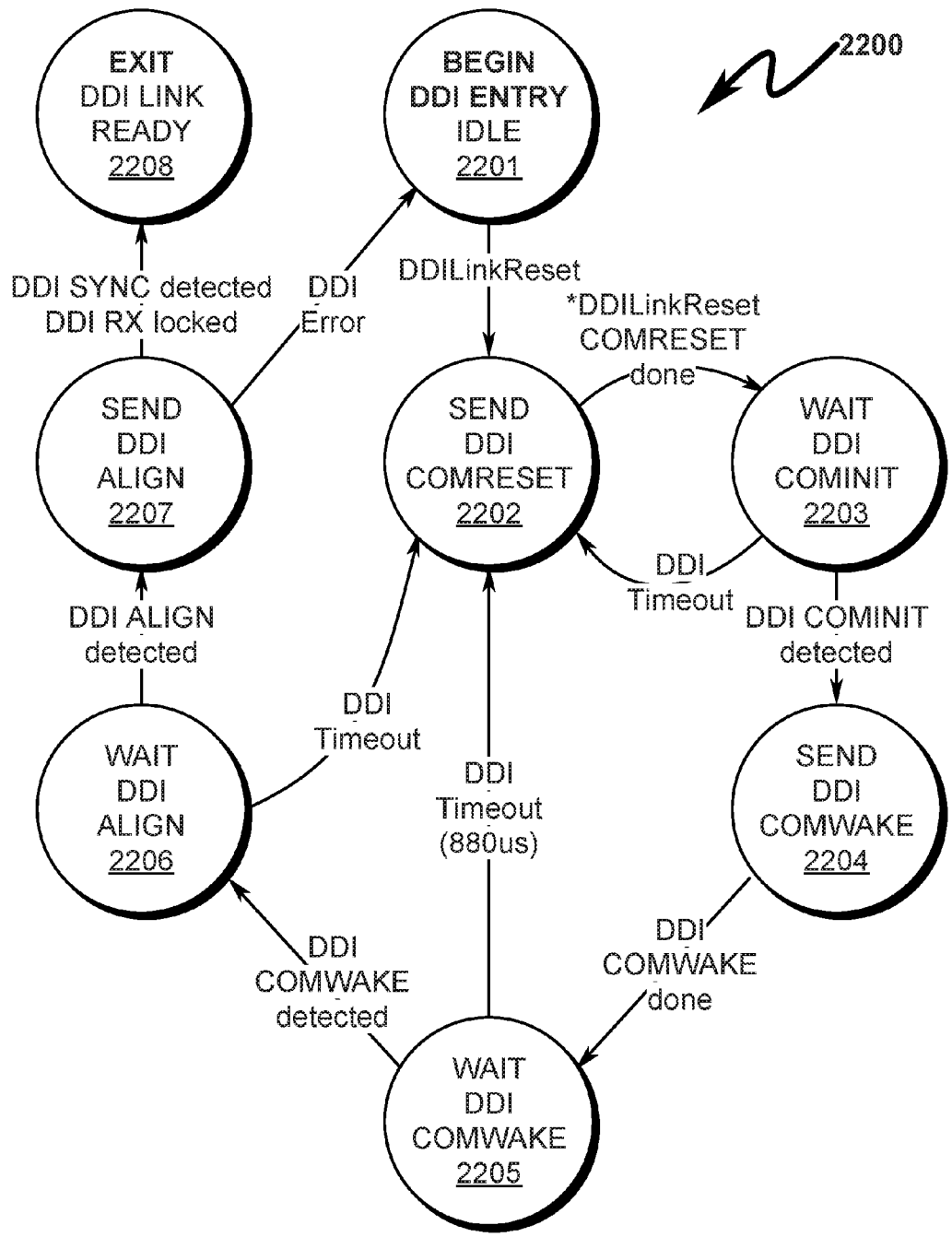
FIG. 22 illustrates a state diagram depicting state transitions for a preferred exemplary invention method embodiment that synchronizes the PTDDC DDI port.

This general system summary may be augmented by the various elements described herein to produce a wide variety of invention embodiments consistent, with this overall design description. A corresponding state machine diagram supporting the flowchart of FIG. 19 (1900) is generally depicted in FIG. 22 (2200).

PTO Port Synchronization Method Implementation (2000)/ (2300)

Figure 20:
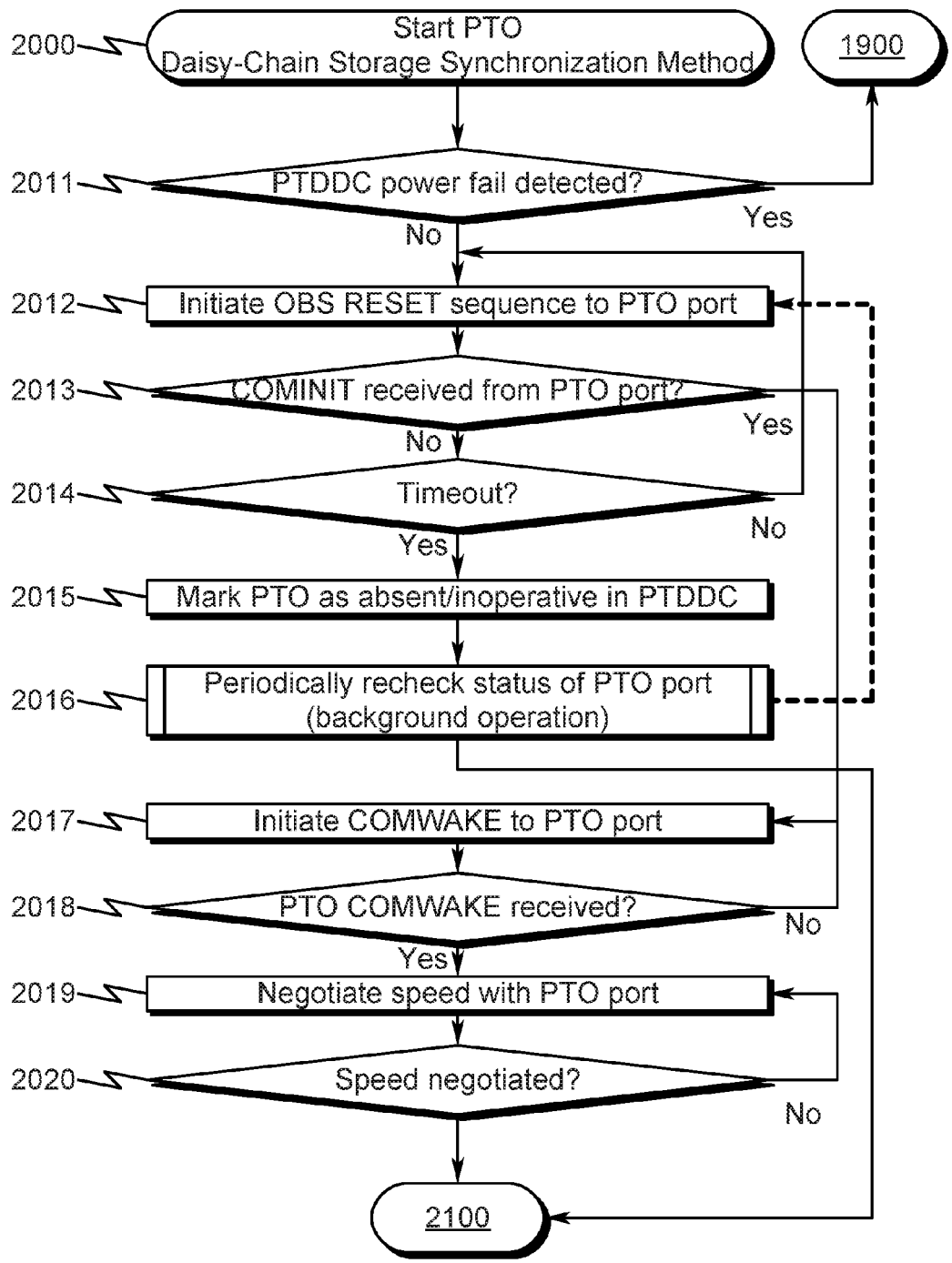
FIG. 20 illustrates a flowchart depicting a preferred exemplary invention method embodiment that synchronizes the PTDDC PTO port.
Figure 23:
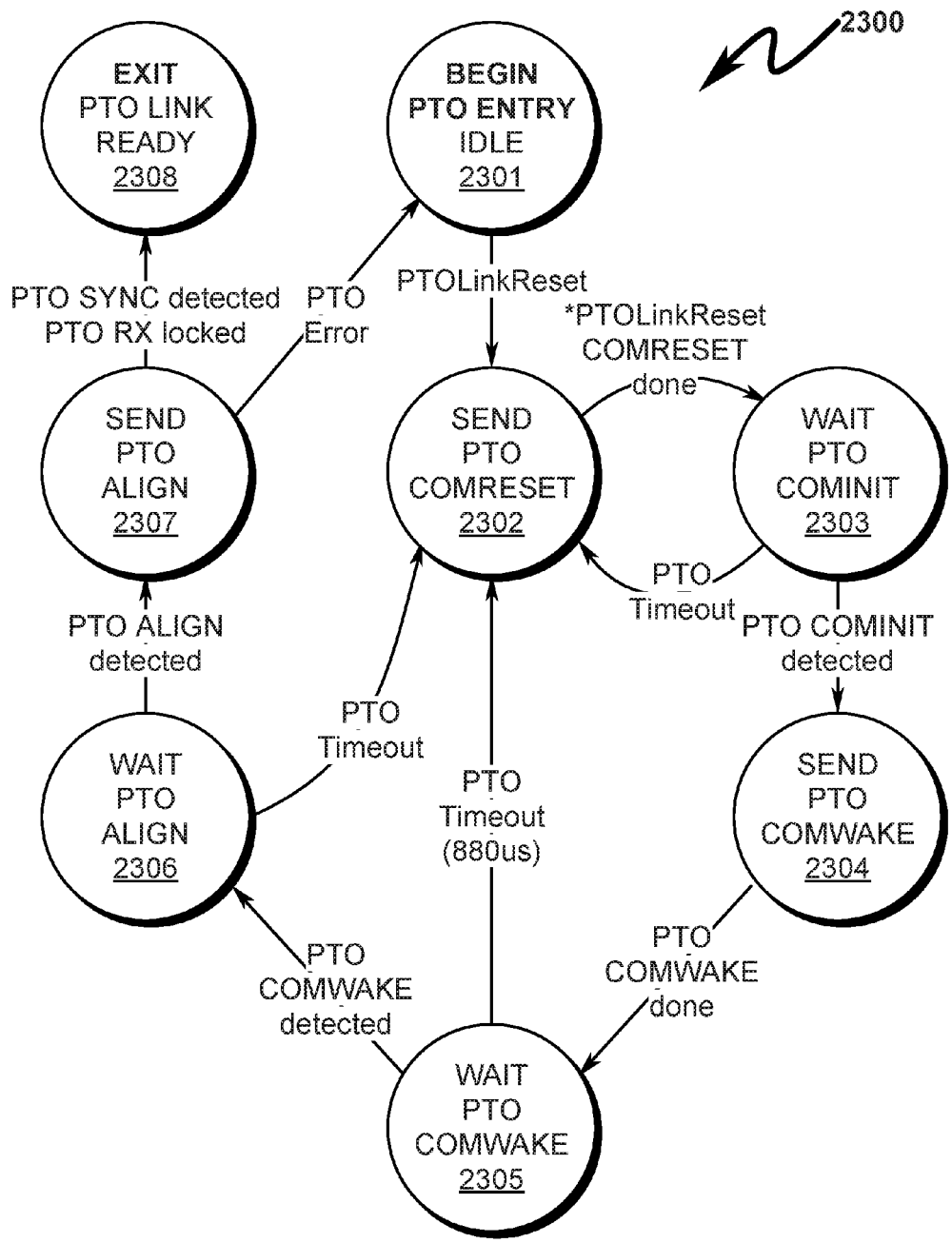
FIG. 23 illustrates a state diagram depicting state transitions for a preferred exemplary invention method embodiment that synchronizes the PTDDC PTO port.

A general overview of the PTO daisy-chain storage synchronization method is depicted in the flowchart of FIG. 20 (2000) and operates in a similar fashion to the DDI port synchronization depicted in FIG. 19 (1900). A corresponding state machine diagram supporting the flowchart of FIG. 20 (2000) is generally depicted in FIG. 23 (2300).

PTI Port Synchronization Method Implementation (2100)/ (2400)

Figure 21:
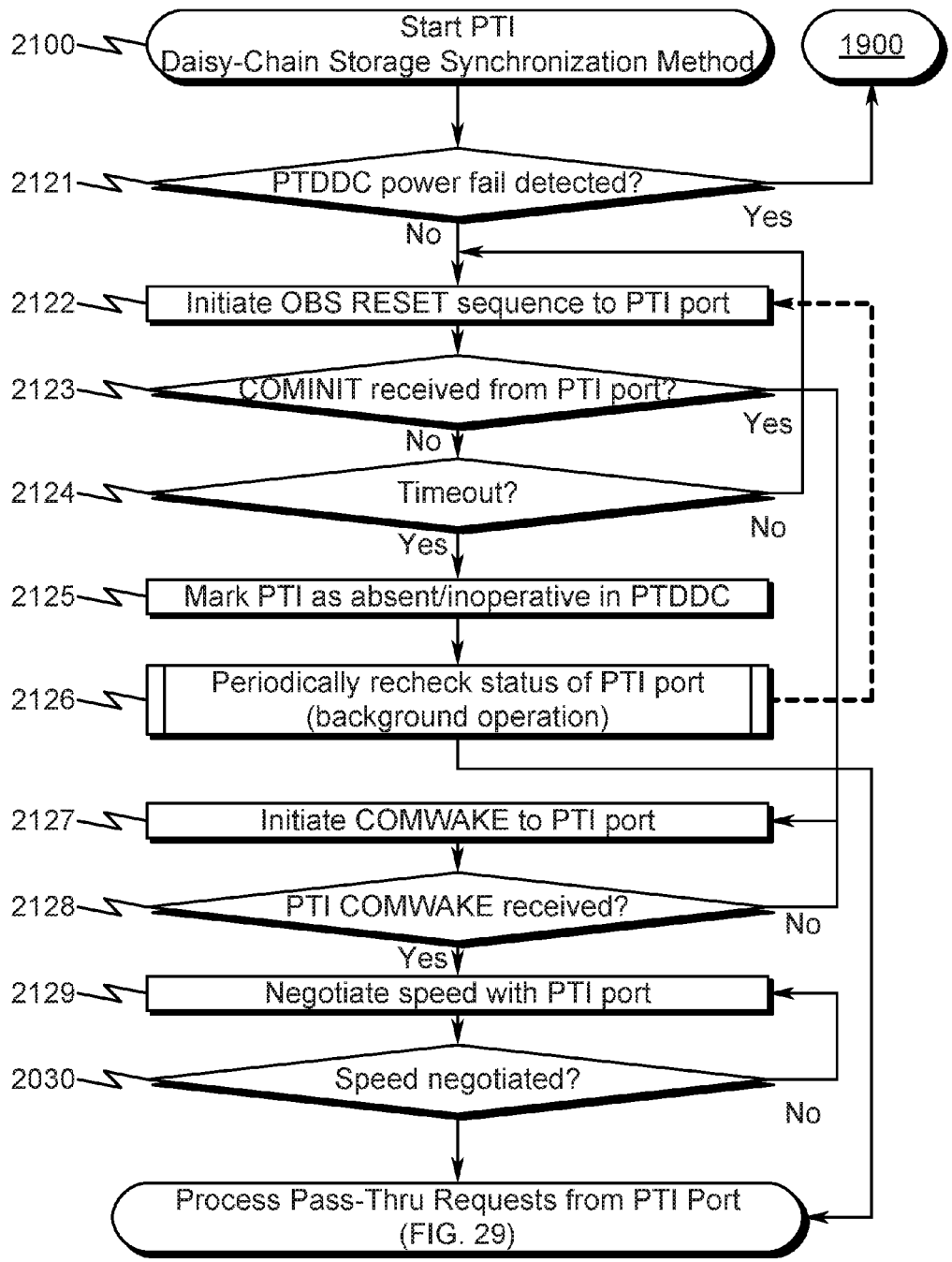
FIG. 21 illustrates a flowchart depicting a preferred exemplary invention method embodiment that synchronizes the PTDDC PTI port.
Figure 24:
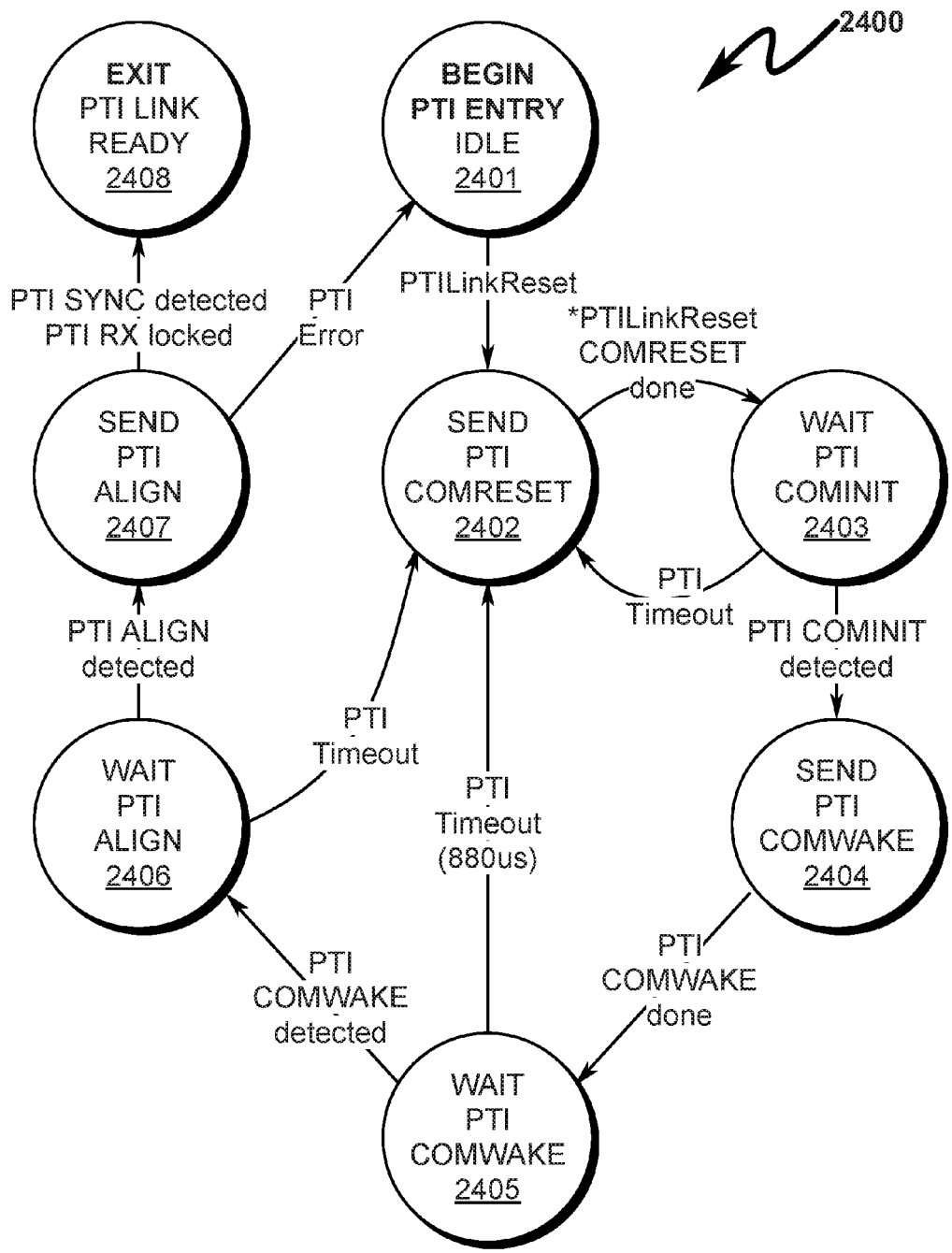
FIG. 24 illustrates a state diagram depicting state transitions for a preferred exemplary invention method embodiment that synchronizes the PTDDC PTI port.

A general overview of the PTO daisy-chain storage synchronization method is depicted in the flowchart of FIG. 21 (2100) and operates in a similar fashion to the DDI port synchronization depicted in FIG. 19 (1900). A corresponding state machine diagram supporting the flowchart of FIG. 21 (2100) is generally depicted in FIG. 24 (2400).

PTDDC LBA Sizing Synchronization (2500)-(2600)

The ordering of PTDDC port sequence initialization has been chosen in many preferred embodiments to ensure that the daisy-chain is initialized from the END of the chain to the BEGINNING of the chain. This permits knowledge of the DDI attached storage to "flow up" the daisy chain in situations where each PTDDC is configured to concatenate downstream storage into a storage array map that is eventually reported to a HBA located at the beginning of the daisy-chain.

For example, if four disk drives having capacities of 1 TB, 2 TB, 3 TB and 4 TB respectively are attached to PTDDC controllers 1, 2, 3, and 4 that are respectively connected in series within the daisy-chain, the last PTDDC will first initialize the 4 TB disk drive, then determine that there is no downstream storage. An upstream PTDDC (#3) can inspect the "size" of PTDDC #4 and determine it to be 4 TB. This information can then be combined with the DDI port #3 information, to indicate a total available size of 3+4=7 TB when PTDDC #3 reports its "size" to PTDDC #2. This upstream reporting will continue up to PTDDC #1 in which the HBA to which it is attached will request a "size" from PTDDC #1 to which this PTDDC will report 1+2+3+ 4 TB=10 TB total size. The HBA in this instance will have no direct knowledge of the attached disk drives connected to PTDDC #1-PTDDC #4, but will only see a single drive having a 10 TB capacity. Of coarse, as detailed in previously incorporated patent/patent applications, LBA requests by the HBA when sent to the first PTDDC will be translated along the daisy-chain such that read/write requests for LBA addresses will be properly directed to the appropriate DDI port based on mapping registers within each PTDDC.

Figure 25:
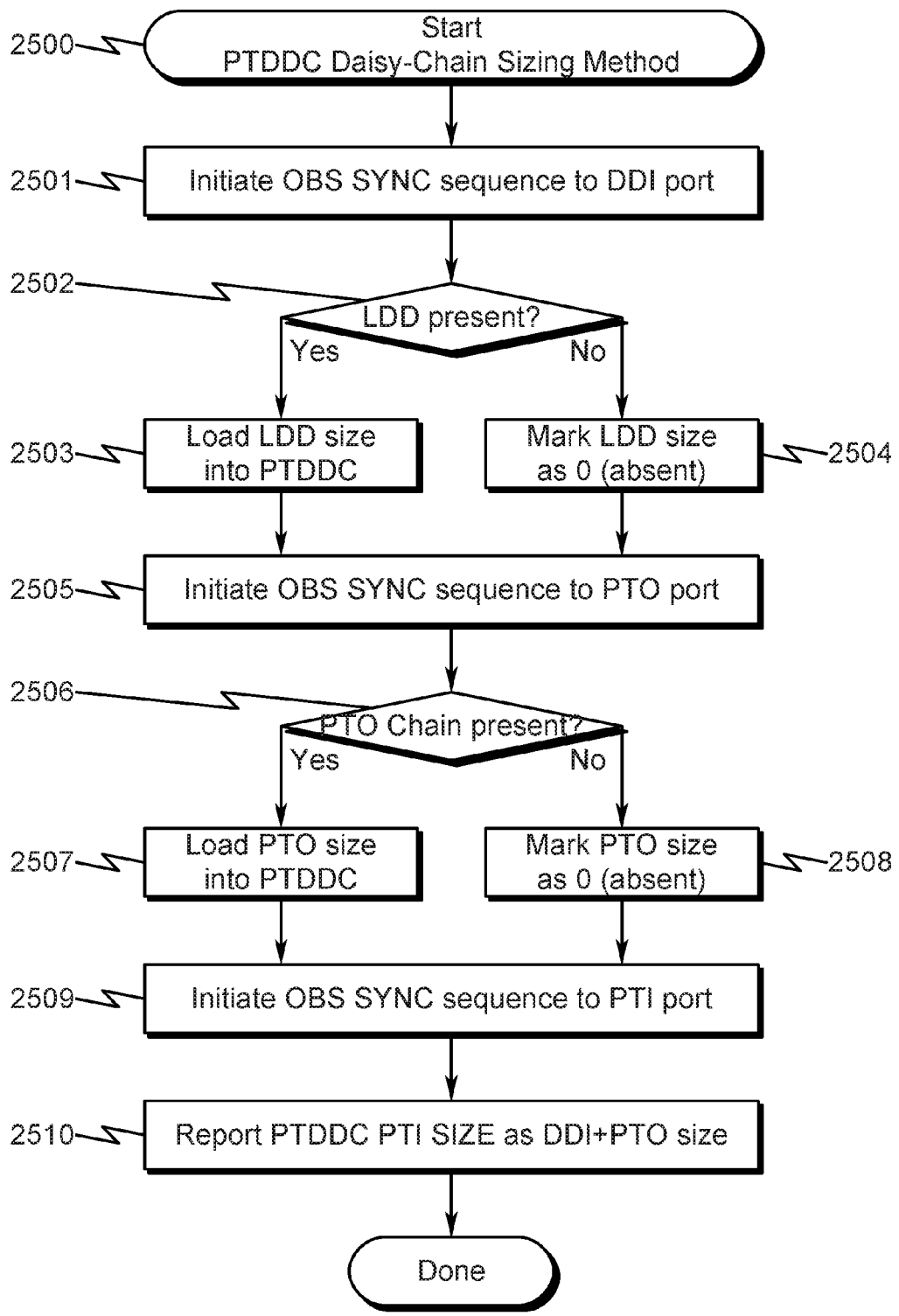
FIG. 25 illustrates a flowchart depicting a preferred exemplary embodiment invention LBA sizing method.

This method is generally depicted in the flowchart of FIG. 25 (2500) and includes the following steps:

(1) Initiating an OBS SYNC sequence to the DDI port to which a local disk drive (LDD) may be attached (2501);
(2) Determining if the LDD is attached, and if not, proceeding to step (4) (2502);
(3) Loading the LDDsize of the LDD into the PTDDC and proceeding to step (5) (2503);
(4) Marking the PTDDC LDDsize as 0 (absent) (2504);
(5) Initiating an OBS SYNC sequence to the PTO port to which a daisy-chain of downstream PTDDCs may be attached (2505);
(6) Determining if the PTO PTDDC daisy-chain is attached, and if not, proceeding to step (8) (2506);
(7) Loading the PTOsize of the downstream PTDDC PTO daisy-chain into the PTDDC and proceeding to step (9) (2507);
(8) Marking the PTDDC PTOsize as 0 (absent) (2508);
(9) Initiating an OBS SYNC sequence to the PTI port to which a host bus adapter (HBA) or upstream daisy-chain of PTDDCs may be attached (2509); and
(10) Reporting the PTDDC PTI size as PTI=LDDsize+PTOsize (2510).

Figure 14:
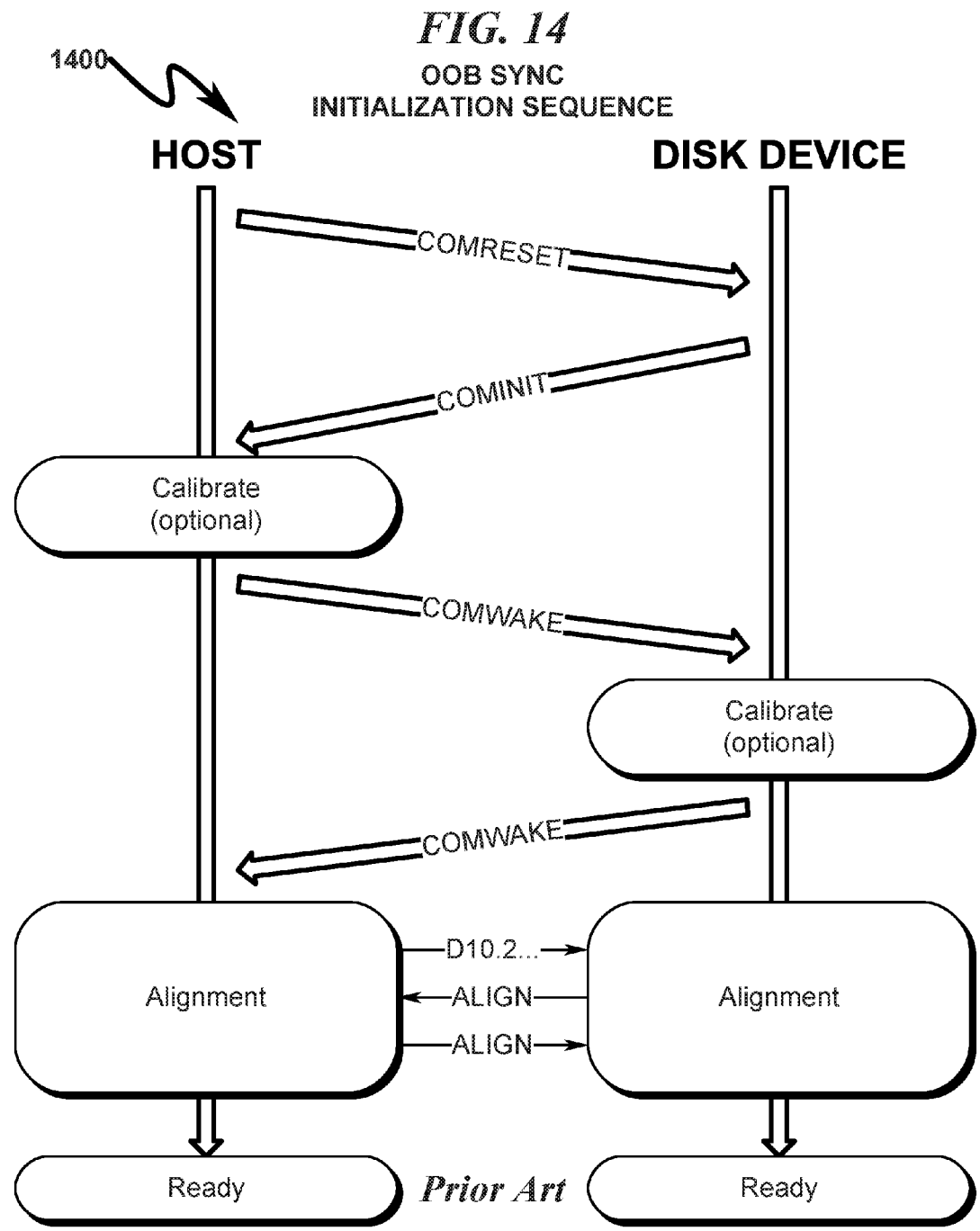
FIG. 14 illustrates a prior art overview state diagram depicting SATA OBS synchronization between a HOST and DISK DRIVE DEVICE.
Figure 15:
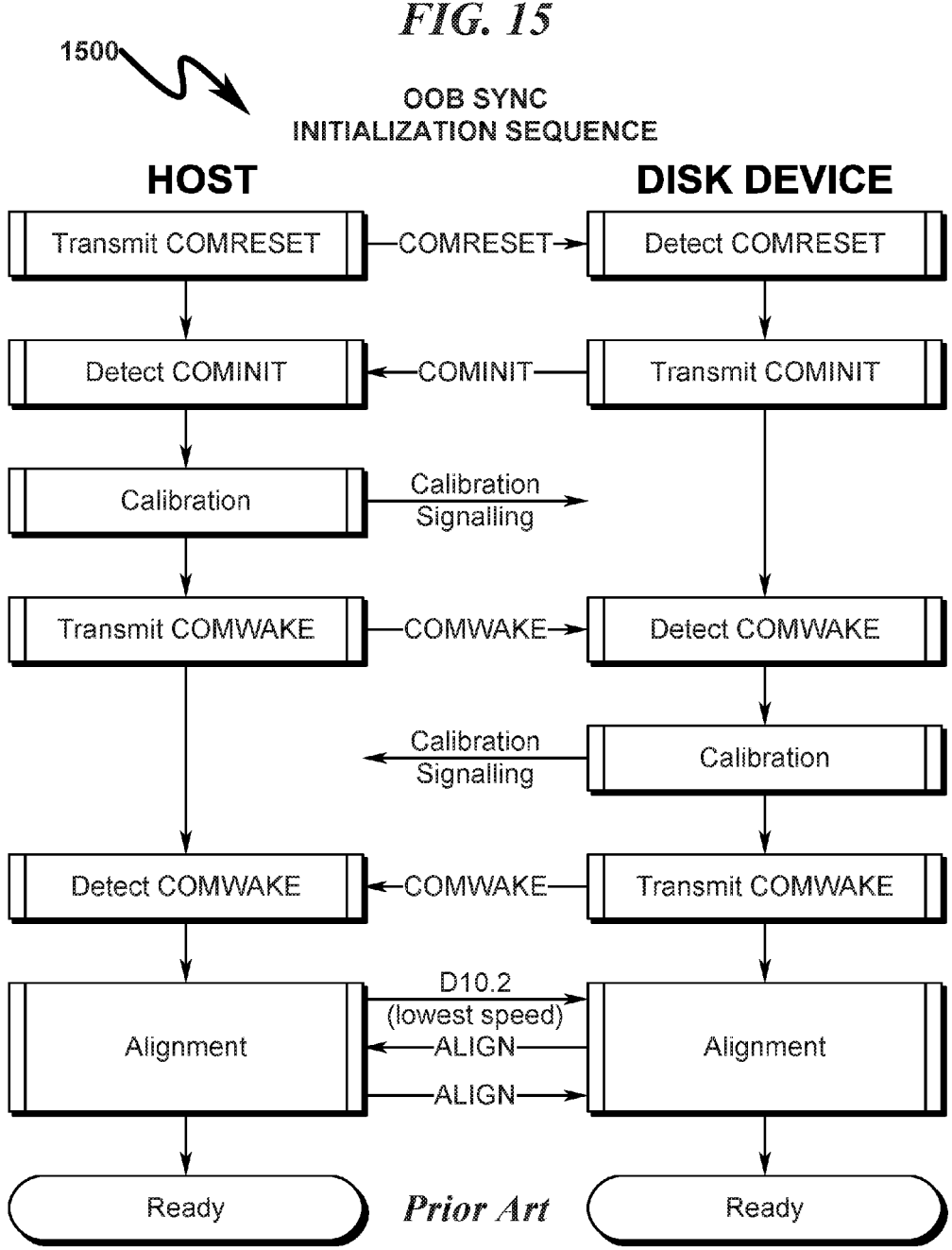
FIG. 15 illustrates a prior art detail state diagram depicting SATA OBS synchronization between a HOST and DISK DRIVE DEVICE.
Figure 16:
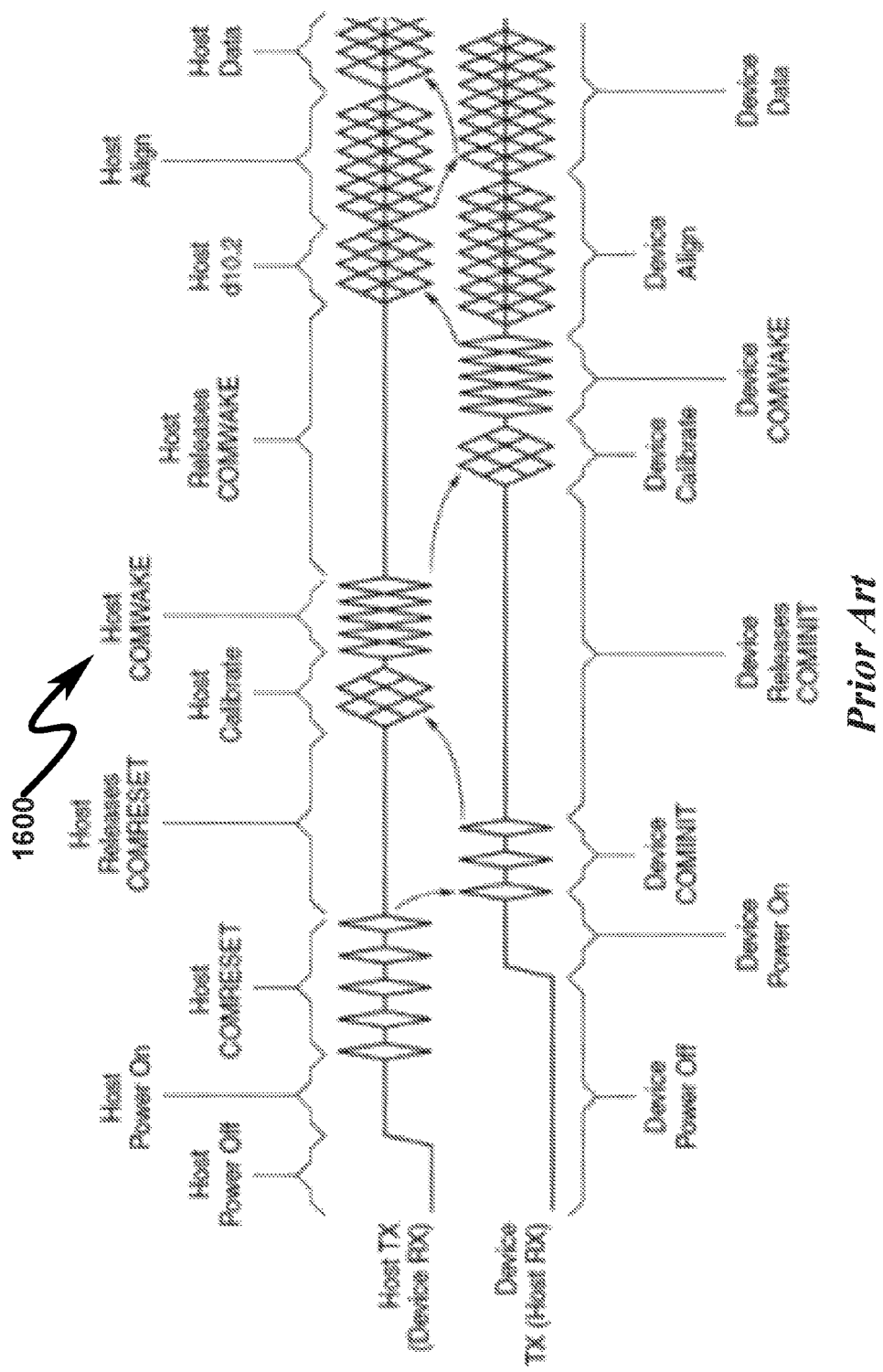
FIG. 16 illustrates a prior art detail timing diagram depicting SATA OBS synchronization between a HOST and DISK DRIVE DEVICE.

The OBS SYNC sequence is generally depicted in FIG. 14 (1400)-FIG. 16 (1600). This general method summary may be augmented by the various elements described herein to produce a wide variety of invention embodiments consistent with this overall design description.

Figure 26:
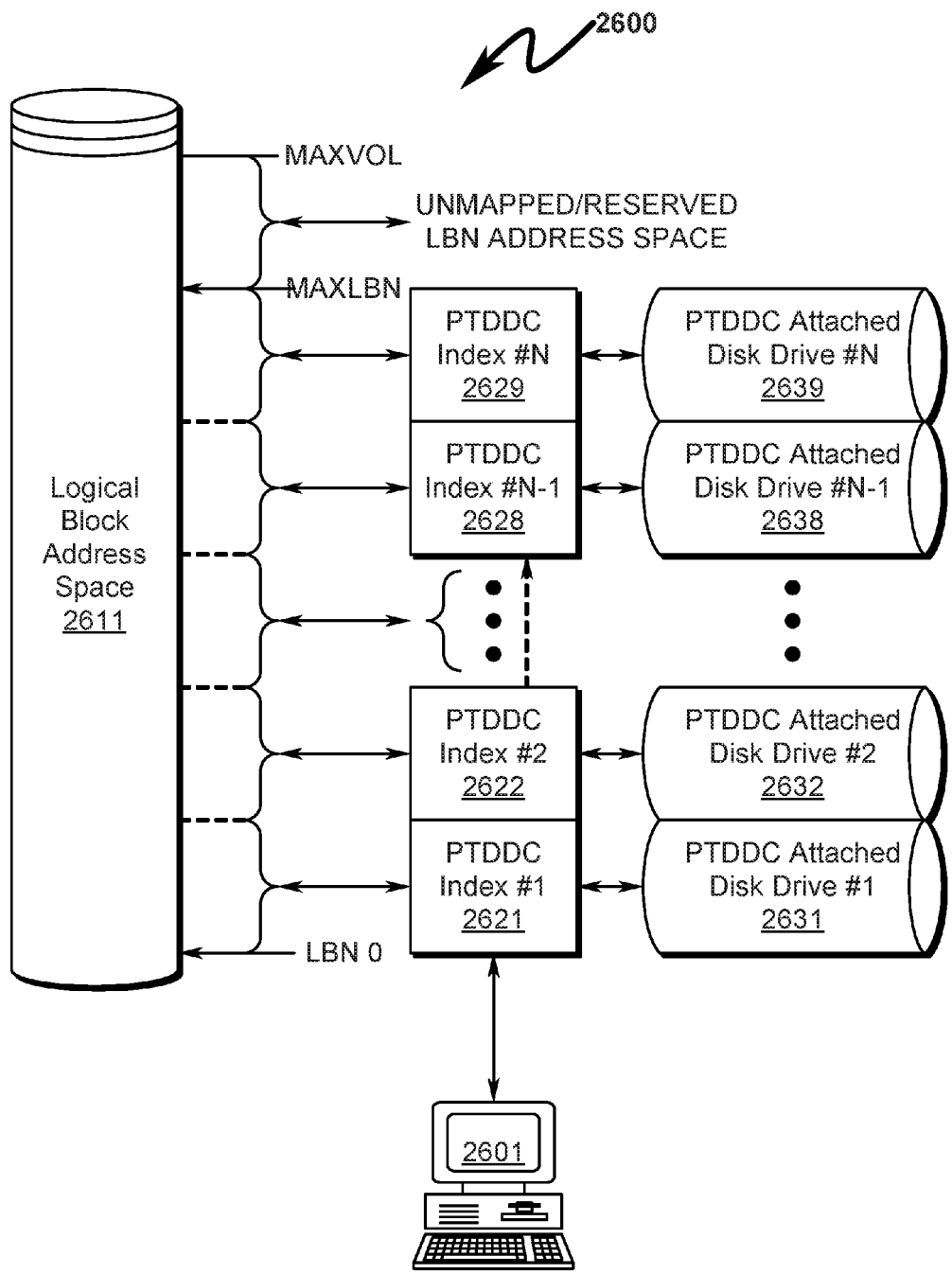
FIG. 26 illustrates a logical depiction of local disk drive (LDD) size concatenation as a result of the method flowchart depicted in FIG. 25.

As generally depicted in FIG. 26 (2600), this size synchronization logic will produce a logical block address space (2611) that maps the summation of all logical blocks associated with the PTDDC daisy-chain (2621, 2622, 2628, 2629) to which the attached local disk drives (2631, 2632, 2638, 2839) are attached. From the perspective of the host computer system (2601), the first PTDDC (2621) appears as a single large disk drive having the concatenated LBA address space (2611) of all the PTDDC-attached local disk drives (2631, 2632, 2638, 2639) in the PTDDC daisy-chain (2621, 2622, 2628, 2629). In some circumstances the first PTDDC (2621) may present a LBA address space (2611) that exceeds the sum of the PTDDC-attached local disk drives (2631, 2632, 2638, 2839) in the PTDDC daisy-chain (2621, 2622, 2628, 2629).

Alternative PTDDC LBA Sizing Synchronization (2700)

Figure 27:
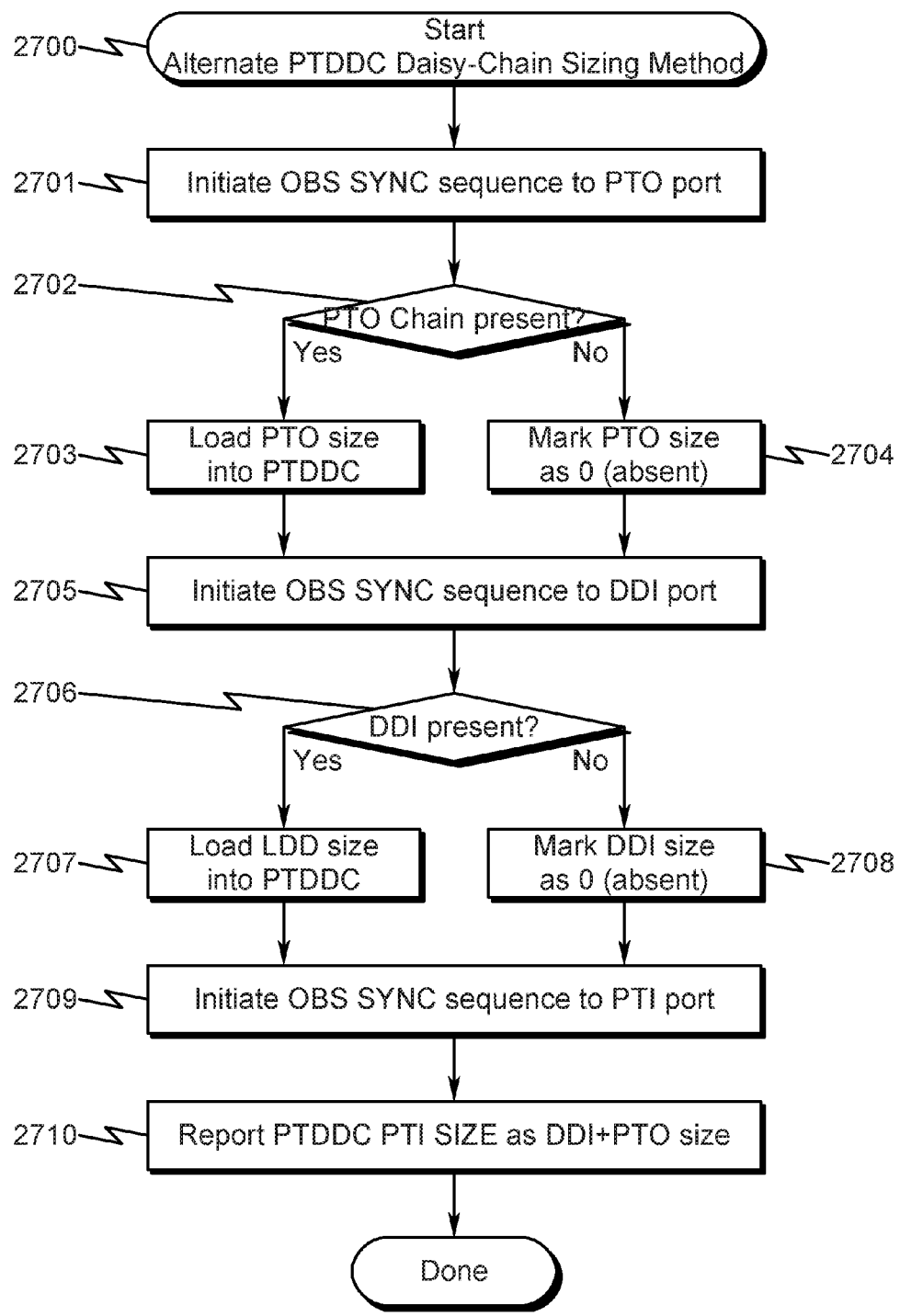
FIG. 27 illustrates a flowchart depicting an alternate preferred exemplary embodiment invention LBA sizing method.

An alternate PTDDC LBA sizing method to that depicted in FIG. 25 (2500) reverses the order in which the DDI and PTO ports are probed for presence and sizing. In this scenario, the PTO port is immediately probed for presence and sizing information and then the DDI/LDD is probed. This allows the daisy-chain sizing to rapidly traverse the chain to the very end of the daisy-chain before LDDs that are attached the individual PTDDCs are probed. This allows any spin-up or startup delays associated with the individual LDDs to be overlapped with other spin-up/startup delays within the daisy-chain. This method is generally depicted in the flowchart of FIG. 27 (2700) and includes the following steps:
(1) Initiating an OBS SYNC sequence to the PTO port to which a daisy-chain of downstream PTDDCs may be attached (2701);
(2) Determining if the PTDDC daisy-chain is attached, and if not, proceeding to step (4) (2702);
(3) Loading the PTOsize of the downstream PTDDC PTO daisy-chain into the PTDDC and proceeding to step (5) (2703);
(4) Marking the PTDDC PTOsize as 0 (absent) (2704);
(5) Initiating an OBS SYNC sequence to the DDI port to which a local disk drive (LDD) may be attached (2705);
(6) Determining if the LDD is attached, and if not, proceeding to step (8) (2706);
(7) Loading the LDDsize of the LDD into the PTDDC and proceeding to step (9) (2707);
(8) Marking the PTDDC LDDsize as 0 (absent) (2708);
(9) Initiating an OBS SYNC sequence to the PTI port to which a host bus adapter (HBA) or upstream daisy-chain of PTDDCs may be attached (2709); and
(10) Reporting the PTDDC PTI size as PTI=LDDsize+PTOsize (2710).

The OBS SYNC sequence is generally depicted in FIG. 14 (1400)-FIG. 16 (1600). This general method summary may be augmented by the various elements described herein to produce a wide variety of invention embodiments consistent with this overall design description.

As generally depicted in FIG. 26 (2600), this size synchronization logic will produce a logical block address space (2611) that maps the summation of all logical blocks associated with the PTDDC daisy-chain (2621, 2622, 2628, 2629) to which the attached local disk drives (2631, 2632, 2638, 2639) are attached. From the perspective of the host computer system (2601), the first PTDDC (2621) appears as a single large disk drive having the concatenated LBA address space (2611) of all the PTDDC-attached local disk drives (2631, 2632, 2638, 2639) in the PTDDC daisy-chain (2621, 2622, 2628, 2629). In some circumstances the first PTDDC (2621) may present a LBA address space (2611) that exceeds the sum of the PTDDC-attached local disk drives (2631, 2632, 2638, 2639) in the PTDDC daisy-chain (2621, 2622, 2628, 2629).

Fixed PTDDC LBA Sizing Synchronization (2800)-(3000)

Figure 28:
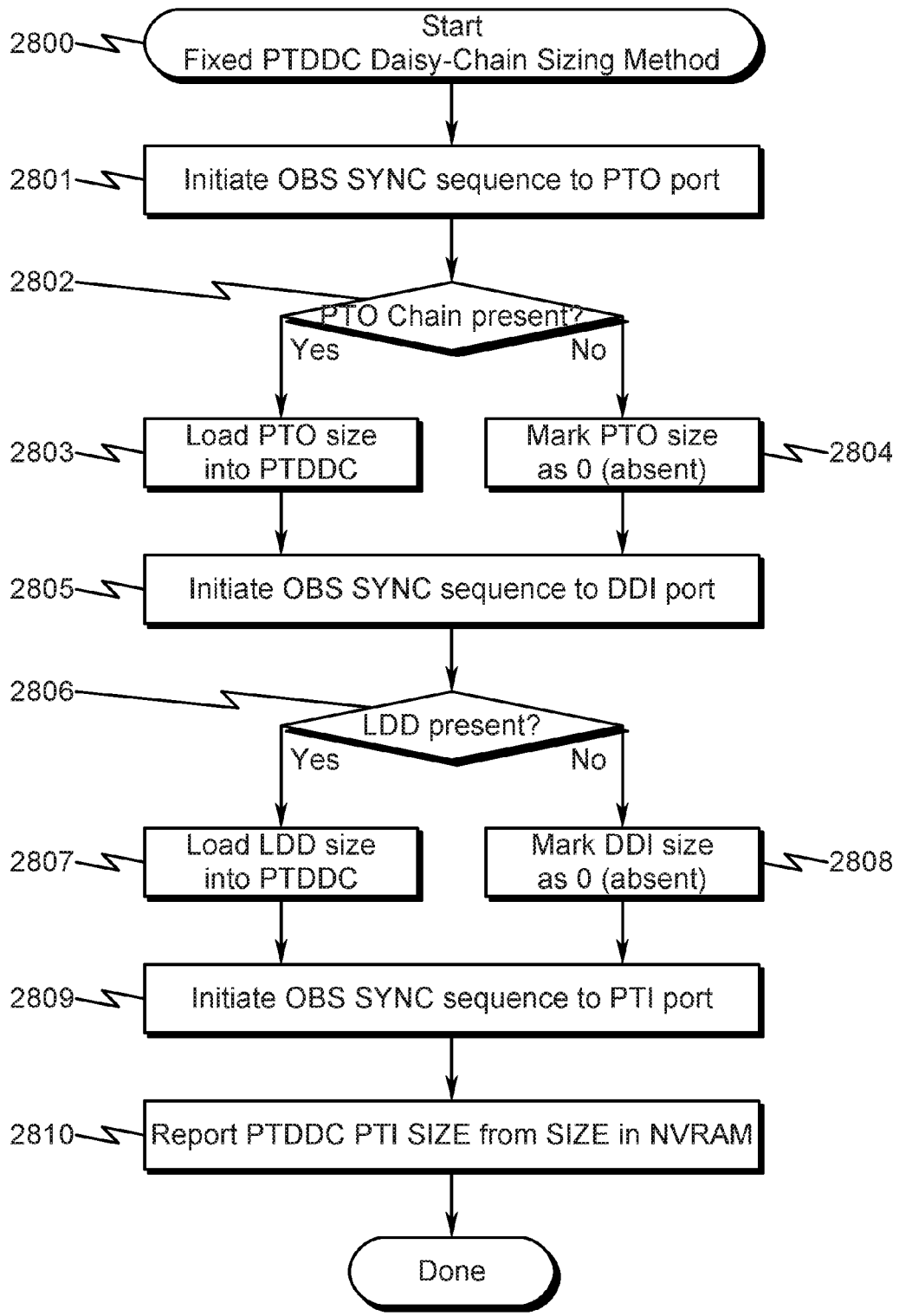
FIG. 28 illustrates a flowchart depicting an alternate preferred exemplary embodiment invention fixed LBA sizing method.

An alternate PTDDC LBA sizing method to that depicted in FIG. 27 (2700) uses a fixed LBA size for the PTDDC that is stored internally in non-volatile memory (NVRAM). In this manner, the individual PTDDC may be programmed to indicate a sparsely populated downstream LBA size that is filled with the LDD and downstream attached LDDs. This method is generally depicted in the flowchart of FIG. 28 (2800) and includes the following steps:
(1) Initiating an OBS SYNC sequence to the PTO port to which a daisy-chain of downstream PTDDCs may be attached (2801);
(2) Determining if the PTDDC daisy-chain is attached, and if not, proceeding to step (4) (2802);
(3) Loading the PTOsize of the downstream PTDDC PTO daisy-chain into the PTDDC and proceeding to step (5) (2803);
(4) Marking the PTDDC PTOsize as 0 (absent) (2804);
(5) Initiating an OBS SYNC sequence to the DDI port to which a local disk drive (LDD) may be attached (2805);
(6) Determining if the LDD is attached, and if not, proceeding to step (8) (2806);
(7) Loading the LDDsize of the LDD into the PTDDC and proceeding to step (9) (2807);
(8) Marking the PTDDC LDDsize as 0 (absent) (2808);
(9) Initiating an OBS SYNC sequence to the PTI port to which a host bus adapter (HBA) or upstream daisy-chain of PTDDCs may be attached (2809); and

(10) Reporting the PTDDC PTI size from a SIZE value stored in NVRAM in the PTDDC (2810).

Figure 29:
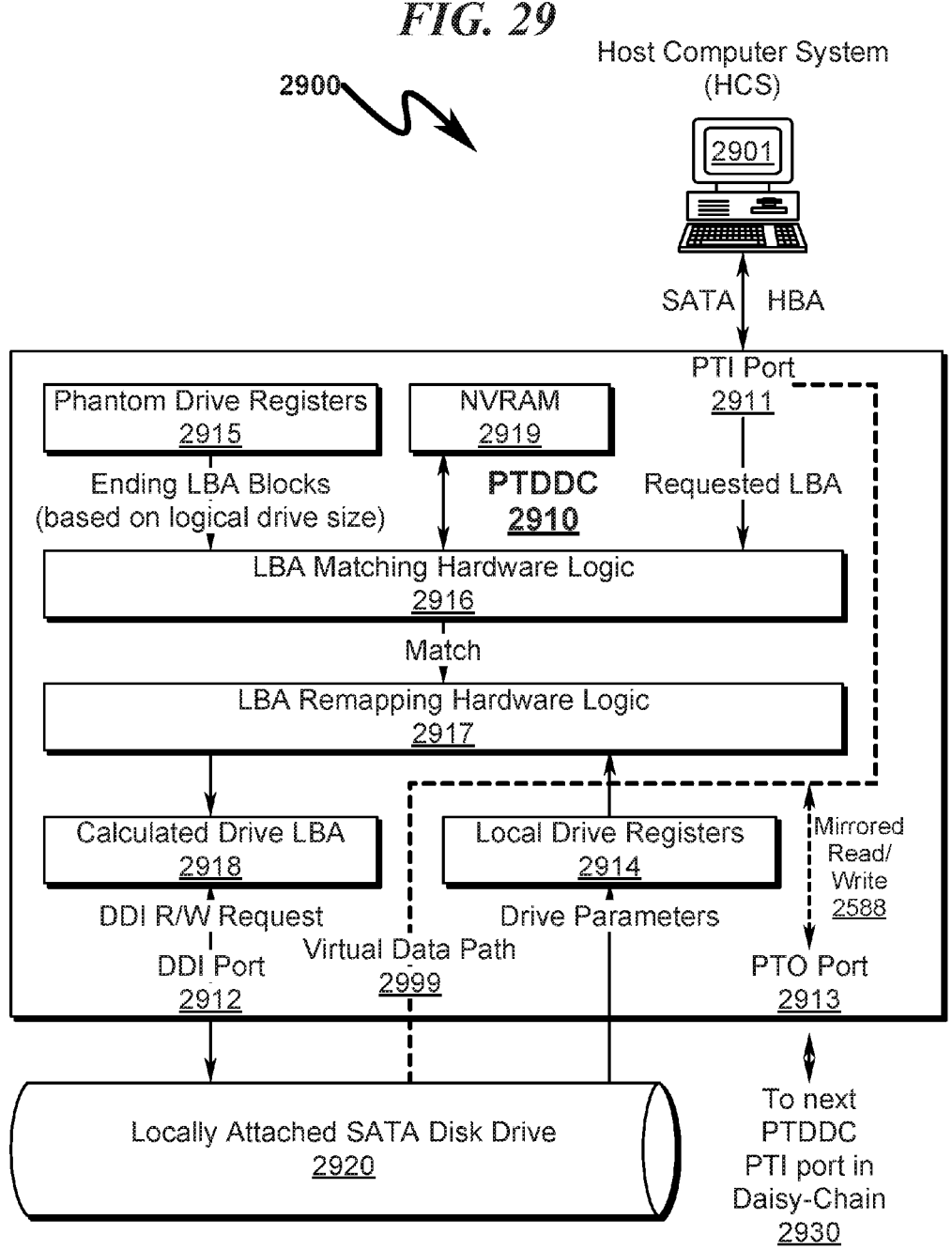
FIG. 29 illustrates an exemplary system block diagram of a preferred PTDDC embodiment incorporating NVRAM for storage of LBA mapping information.

The OBS SYNC sequence is generally depicted in FIG. 14 (1400)-FIG. 16 (1600). Integration of NVRAM (2919) within the context of this PTDDC method is generally depicted in the PTDDC system block diagram of FIG. 29 (2900). This general method summary may be augmented by the various elements described herein to produce a wide variety of invention embodiments consistent with this overall design description.

As generally depicted in FIG. 26 (2600), this size synchronization logic will produce a logical block address space (2611) that maps the summation of ail logical blocks associated with the PTDDC daisy-chain (2621, 2622, 2628, 2629) to which the attached local disk drives (2631, 2632, 2638, 2639) are attached. From the perspective of the host computer system (2601), the first PTDDC (2621) appears as a single large disk drive having the concatenated LBA address space (2611) of ail the PTDDC-attached local disk drives (2631, 2632, 2638, 2639) in the PTDDC daisy-chain (2621, 2622, 2628, 2629). In some circumstances the first PTDDC (2621) may present a LBA address space (2611) that exceeds the sum of the PTDDC-attached local disk drives (2631, 2632, 2638, 2639) in the PTDDC daisy-chain (2621, 2622, 2628, 2629). With this fixed sizing scenario, the MAXLBN and MAXVOL values will typically be different as there will generally be a gap in LBA address space to accommodate unmapped/reserved LBN address space.

Figure 30:
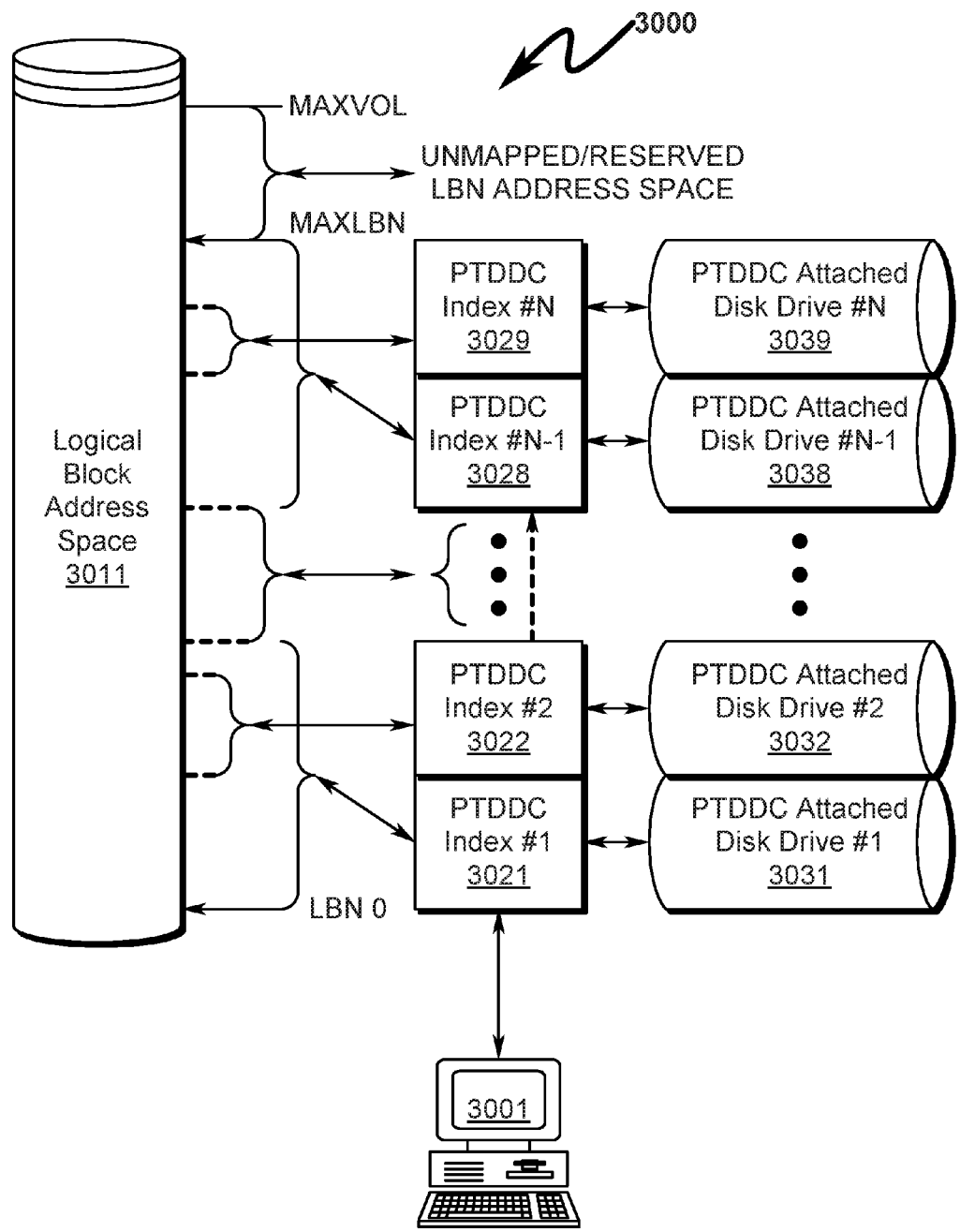
FIG. 30 illustrates an exemplary fragmented LBA map associated with individual PTDDCs incorporating fixed LBA sizing.

As generally illustrated in FIG. 30 (3000), the use of fixed sizing within the context of PTDDC LBA mapping may permit one or more of the PTDDCs in the daisy chain (3021, 3028) to map individual address spaces that are larger than the associated LDDs (3031, 3032, 3038, 3039). This may permit holes in the LBA address map to be incorporated in the overall LBA address space (3011). These holes may be filled at a later time with newly attached LDD storage or in some circumstances left as-is to allow later expansion of the physical address space of the storage system without modification of the logical address space of the storage system. This ability to enhance the physical storage of the system at a later time provides for this expansion without the need for reformatting or other operating system, modifications to the data stored on the daisy-chain storage system.

PTDDC Register State Machine (RSM) (2100)-(3200)

Figure 31:
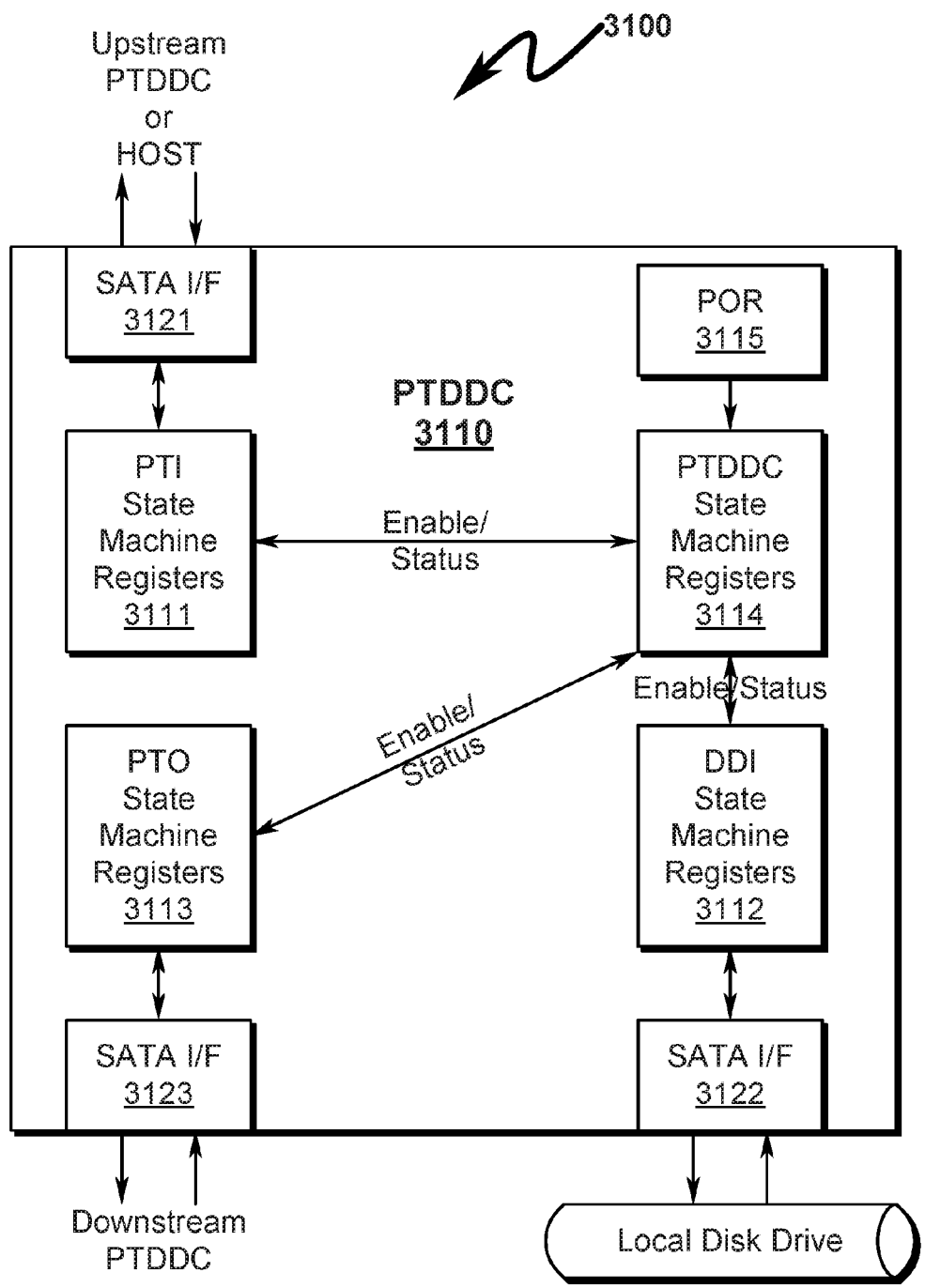
FIG. 31 illustrates a block diagram depicting the interaction between hardware register state machines within the PTDDC in a preferred invention system embodiment.
Figure 32:
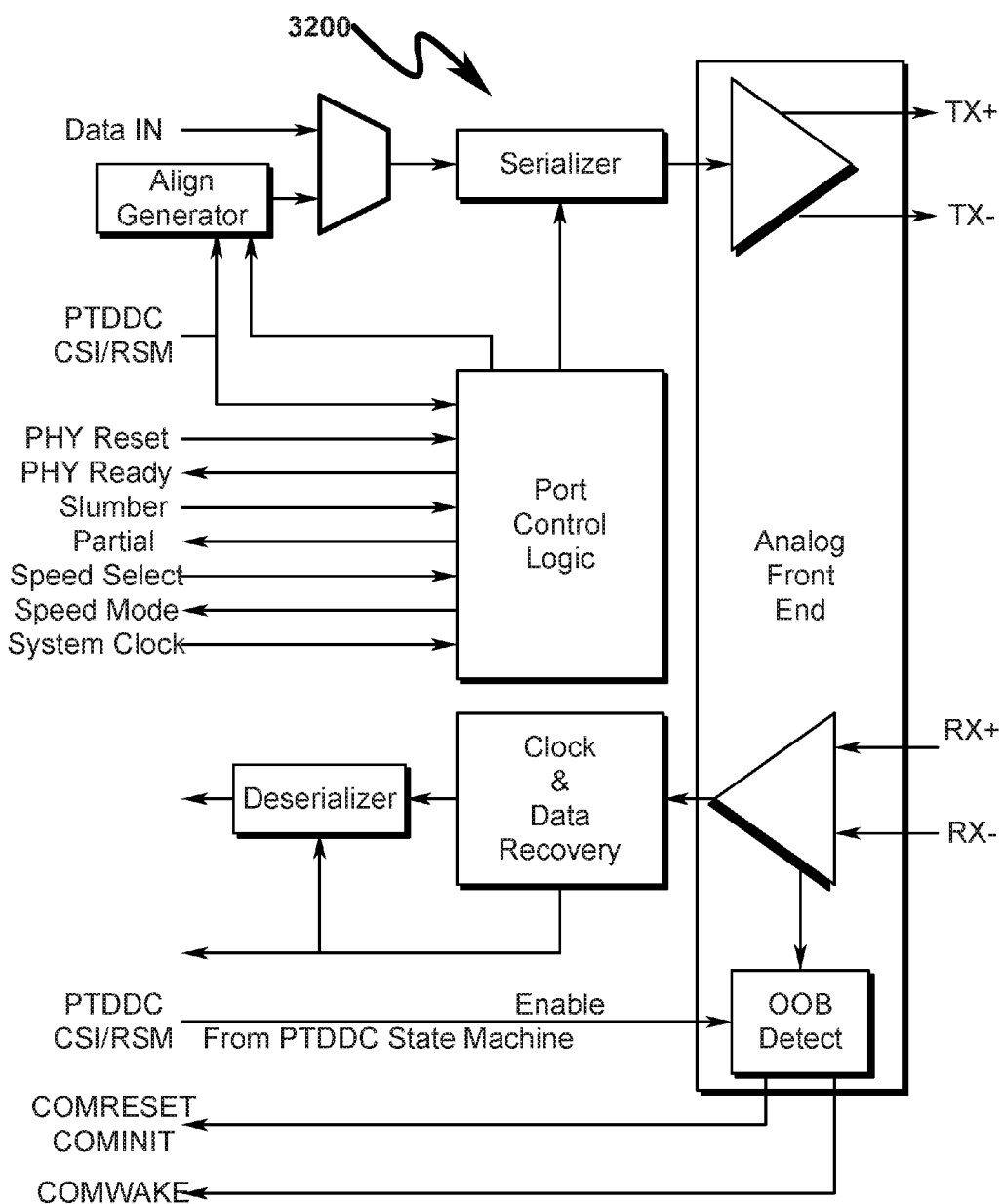
FIG. 32 illustrates integration of PTDDC RSM logic controls within a typical SATA communication port used to service the PTI, DDI, and PTO SATA communication ports.

FIG. 31 (3100)-FIG. 32 (3200) depict integration of the PTDDC register state machine (RSM) such that drive state information (DSI) relating to the LDD is individually maintained in the PTDDC as well as chain state information (CSX) relating to the individual PTDDC within the daisy-chain. The RSM (3114) as indicated in FIG. 31 (3100) is a hardware-based state machine that is initialized with a power-on reset (POR) circuit (3115) on power-up so as to coordinate the operation of the PTI (3111), DDI (3112), and PTO (3113) state machines that coordinate operation, of respective individual SATA communication ports (3121, 3122, 3123).

Details of the individual hardware ports (3121, 3122, 3123) is provided in FIG. 31 (3100) and indicates that the RSM (3114) provides chain state information (CSI) relating to the individual PTDDC to enable/disable the OOB communication protocols and ALIGN generator within each individual SATA communication port (3121, 3122, 3123).

System Summary

The present invention system anticipates a wide variety of variations in the basic theme of construction, but can be generalized as a daisy-chain storage synchronization, system comprising:
(a) plurality of pass-thru disk drive controllers (PTDDCs); and
(b) plurality of local disk, drives (LDDs);
wherein:
the plurality of PTDDCs each comprise a pass-thru input (PTI) port, pass-thru output (PTO) port, and disk drive interface (DDI) port;
the PTI port, the PTO port, and the DDI port each comprise a serial advanced technology attachment (SATA) interface;
the plurality of PTDDCs are each connected in a serial daisy-chain with only the PTI port of a member PTDDC in the daisy-chain connected to the PTO port of a previous PTDDC in the daisy-chain and the PTO port of the member PTDDC connected to the PTI port of a next PTDDC in the daisy-chain;
the plurality of PTDDCs are individually electrically coupled via the DDI port on the individual PTDDC to one of the plurality of the LDDs;
the daisy-chain comprises a first PTDDC at the beginning of the daisy-chain further comprising a first PTI port, a first PTO port, and a first DDI port;
the first PTDDC is configured for connection to a host, computer system (HCS) having a host bus adapter (HBA) via the first PTI port;
the plurality of PTDDCs each comprise a PTI out-of-band signaling (CBS) register-based hardware state machine (PTIRSM), a PTO out-of-band signaling (OBS) register-based hardware state machine (PTORSM), a DDI out-of-band signaling (OBS) register-based hardware state machine (DDIRSM), and a PTDDC register-based hardware state machine (PTTRSM);
the PTIRSM is configured to implement a SATA out-of-band signaling SATA hardware interface on the PTI port;
the PTORSM is configured to implement a SATA out-of-band signaling SATA hardware interface on the PTO port;
the DDIRSM is configured to implement a SATA out-of-band signaling SATA hardware interface on the DDI port; and
the PTTRSM is configured to control operation of the PTIRSM, the PTORSM, and the DDIRSM This general system summary may be augmented by the various elements described herein to produce a wide variety of invention embodiments consistent with this overall design description.

Method Summary

The present invention method anticipates a wide variety of variations in the basic theme of implementation, but can be generalized as a daisy-chain storage synchronization method comprising:
(1) with a register-based hardware state machine (PTTRSM) operating on each of a plurality of pass-thru disk drive controllers (PTDDCs) (each comprising a serial advanced technology attachment (SATA) interface pass-thru input (PTI) port, serial advanced technology attachment (SATA) interface pass-thru output (PTO) port, and serial advanced technology attachment (SATA) interface disk drive interface (DDI) port), controlling the sequential operation of a PTI out-of-band signaling (OBS) register-based hardware state machine (PTIRSM), a PTO out-of-band signaling (OBS) register-based hardware state machine (PTORSM), and a DDI out-of-band signaling (OBS) register-based hardware state machine (DDIRSM), each of which is present on each of the PTDDC;

(2) with the PTIRSM, implementing a SATA out-of-band signaling SATA hardware interface on the PTI port;

(3) with the PTORSM, implementing a SATA out-of-band signaling SATA hardware interface on the PTO port; and (4) with the DDIRSM, implementing a SATA out-of-band signaling SATA hardware interface on the DDI port;

wherein:

the plurality of PTDDCs are each connected in a serial daisy-chain with only the PTI port of a member PTDDC in the daisy-chain connected to the PTO port of a previous PTDDC in the daisy-chain and the PTO port of the member PTDDC connected to the PTI port of a next PTDDC in the daisy-chain;

the plurality of PTDDCs are individually electrically coupled via the DDI port on the individual PTDDC to one of the plurality of the LDDs;

the daisy-chain comprises a first PTDDC at the beginning of the daisy-chain further comprising a first PTI port, a first PTO port, and a first DDI port; and the first PTDDC is configured for connection to a host computer system (HCS) having a host bus adapter (HBA) via the first PTI port.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and its associated method may be augmented with a variety of ancillary embodiments, including but not limited to:

An embodiment wherein the PTTRSM is configured to first initiate operation of the DDIRSM, then the PTORSM, and then the PTIRSM.

An embodiment wherein the PTTRSM is configured to first initiate operation of the DDIRSM, then the PTORSM, and then the PTIRSM, and then report a logical block address (LBA) size to the PTI port equivalent to the sum of a LBA size retrieved from the DDI port and a LBA size retrieved from the PTO port.

An embodiment wherein the PTTRSM is configured to first initiate operation of the PTORSM, then the DDIRSM, and then the PTIRSM.

An embodiment wherein the PTTRSM is configured to first initiate simultaneous operation of the PTORSM and the DDIRSM, and then the PTIRSM.

An embodiment wherein the PTTRSM is configured to first initiate operation of the PTORSM, then the DDIRSM, and then the PTIRSM, and then report a logical block address (LBA) size to the PTI port equivalent to the sum of a LBA size retrieved from the DDI port and a LBA size retrieved from the PTO port.

An embodiment wherein the PTTRSM is configured to first initiate operation of the PTORSM, then the DDIRSM, and then the PTIRSM, and then report a fixed logical block address (LBA) size to the PTI port that is retrieved from non-volatile memory (NVRAM) within the PTDDC.

An embodiment wherein the PTTRSM is configured to first initiate operation of the PTORSM, then the DDIRSM, and then the PTIRSM, and then report a fixed logical block address (LBA) size to the PTI port.

An embodiment wherein the first PTDDC maintains a set of phantom disk drive registers (PDR) having a reported maximum logical block address (LBA) virtual address space that is larger than the number of logical blocks present on each of the plurality of the LDDs.

An embodiment wherein the first PTDDC maintains a set of phantom disk drive registers (PDR) having a reported maximum logical block address (LBA) virtual address space that is larger than the number of logical blocks present on each of the plurality of the LDDs and the PDR are configured to present only a single SATA disk drive interface to the HCS.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710, 578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A daisy-chain storage synchronization (DSS) system and method that permits a daisy-chain of interconnected pass-thru disk drive controllers (PTDDCs) each connected to a SATA local disk drive (LDD) disk storage element (DSE) to support state synchronization within PTDDCs in the daisy-chain has been disclosed. The PTDDCs within the daisy-chain are configured to individually maintain drive state information (DSI) relating to the LDD as well as chain state information (CSI) relating to the individual PTDDC within the daisy-chain. This state information may be modified on receipt of out-of-band signaling (OBS) from, other PTDDC elements up the daisy-chain as well as OBS from other PTDDC elements down the daisy-chain. CSI is determined in part by conventional SATA OBS state register protocols that are modified by internal state registers (ISR) in each individual PTDDC daisy-chain element so as to make the DSS transparent to existing SATA OBS single-disk standard hardware command protocols.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. §112(f) and such claim shall be construed to cover the corresponding structure, material, or acts described in the specification and equivalents thereof.

The phrase "MEANS FOR" specifically invokes the means-plus-function claims limitation recited in 35 U.S.C. §112 (f) and such claim shall be construed to cover the corresponding structure, material, or acts described in the specification and equivalents thereof.

The phrase "STEP FOR" specifically invokes the step-plus-function claims limitation recited in 35 U.S.C. §112 (f) and such claim shall be construed to cover the corresponding structure, material, or acts described in the specification and equivalents thereof.

The step-plus-function claims limitation recited in 35 U.S.C. §112 (f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

Although preferred embodiment the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A daisy-chain storage synchronization system comprising:
   (a) plurality of pass-thru disk drive controllers (PTDDCs); and
   (b) plurality of local disk drives (LDDs);
   wherein:
   said plurality of PTDDCs each comprise a pass-thru input (PTI) port, pass-thru output (PTO) port, and disk drive interface (DDI) port;
   said PTI port, said PTO port, and said DDI port each comprise a serial advanced technology attachment (SATA) interface;
   said plurality of PTDDCs are each connected in a serial daisy-chain with only the PTI port of a member PTDDC in said daisy-chain connected to the PTO port of a previous PTDDC in said daisy-chain and the PTO port of said member PTDDC connected to the PTI port of a next PTDDC in said daisy-chain;
   said plurality of PTDDCs are individually electrically coupled via said DDI port on said individual PTDDC to one of said plurality of said LDDs;
   said daisy-chain comprises a first PTDDC at the beginning of said daisy-chain further comprising a first PTI port, a first PTO port, and a first DDI port;
   said first PTDDC is configured for connection to a host computer system (HCS) having a host bus adapter (HBA) via said first PTI port;
   said plurality of PTDDCs each comprise a PTI out-of-band signaling (OBS) register-based hardware state machine (PTIRSM), a PTO out-of-band signaling (OBS) register-based hardware state machine (PTORSM), a DDI out-of-band signaling (OBS) register-based hardware state machine (DDIRSM), and a PTDDC register-based hardware state machine (PTTRSM);
   said PTIRSM is configured to implement a SATA out-of-band signaling SATA hardware interface on said PTI port;
   said PTORSM is configured to implement a SATA out-of-band signaling SATA hardware interface on said PTO port;
   said DDIRSM is configured to implement a SATA out-of-band signaling SATA hardware interface on said DDI port; and
   said PTTRSM is configured to control operation of said PTIRSM, said PTORSM, and said DDIRSM by modifying an operation sequence for said PTIRSM, said PTORSM, and said DDIRSM using a digital signal.

2. The daisy-chain storage synchronization system of claim 1 wherein said PTTRSM is configured to first initiate operation of said DDIRSM, then said PTORSM, and then said PTIRSM.

3. The daisy-chain storage synchronization system of claim 1 wherein said PTTRSM is configured to first initiate operation of said DDIRSM, then said PTORSM, and then said PTIRSM, and then report a logical block address (LBA) size to said PTI port equivalent to the sum of a LBA size retrieved from said DDI port and a LBA size retrieved from said PTO port.

4. The daisy-chain storage synchronization system of claim 1 wherein said PTTRSM is configured to first initiate operation of said PTORSM, then said DDIRSM, and then said PTIRSM.

5. The daisy-chain storage synchronization system of claim 1 wherein said PTTRSM is configured to first initiate simultaneous operation of said PTORSM and said DDIRSM, and then said PTIRSM.

6. The daisy-chain storage synchronization system of claim 1 wherein said PTTRSM is configured to first initiate operation of said PTORSM, then said DDIRSM, and then said PTIRSM, and then report a logical block address (LBA) size to said PTI port equivalent to the sum of a LBA size retrieved from said DDI port and a LBA size retrieved from said PTO port.

7. The daisy-chain storage synchronization system of claim 1 wherein said PTTRSM is configured to first initiate operation of said PTORSM, then said DDIRSM, and then, said PTIRSM, and then report a fixed logical block address (LBA) size to said PTI port that is retrieved from non-volatile memory (NVRAM) within, said PTDDC.

8. The daisy-chain storage synchronization system of claim 1 wherein said PTTRSM is configured to first initiate operation of said PTORSM, then said DDIRSM, and then said PTIRSM, and then report a fixed logical block address (LBA) size to said PTI port.

9. The daisy-chain storage synchronization system of claim 1 wherein said first PTDDC maintains a set of phantom disk drive registers (PDR) having a reported maximum logical block address (LBA) virtual address space that is larger than the number of logical blocks present on each of said plurality of said LDDs.

10. The daisy-chain storage synchronization system of claim 1 wherein said first PTDDC maintains a set of phantom disk drive registers (PDR) having a reported maximum logical block address (LBA) virtual address space that is larger than the number of logical blocks present on each of said plurality of said LDDs and said PDR are configured to present only a single SATA disk drive interface to said HCS.

11. A daisy-chain storage synchronization method comprising:
(1) with a register-based hardware state machine (PTTRSM) operating on each of a plurality of pass-thru disk drive controllers (PTDDCs), with each comprising a serial advanced technology attachment (SATA) interface pass-thru input (PTI) port, SATA interface pass-thru output (PTO) port, and SATA interface disk drive interface (DDI) port, controlling using a digital signal the sequential operation of a PTI out-of-band signaling (OBS) register-based hardware state machine (PTIRSM), a PTO out-of-band signaling (OBS) register-based hardware state machine (PTORSM), and a DDI out-of-band signaling (OBS) register-based hardware state machine (DDIRSM), each of which is present on each of said PTDDC;

(2) with said PTIRSM, implementing a SATA out-of-band signaling SATA hardware interface on said PTI port;
(3) with said PTORSM, implementing a SATA out-of-band signaling SATA hardware interface on said PTO port; and
(4) with said DDIRSM, implementing a SATA out-of-band signaling SATA hardware interface on said DDI port;

wherein:
said plurality of PTDDCs are each connected in a serial daisy-chain with only the PTI port of a member PTDDC in said daisy-chain connected to the PTO port of a previous PTDDC in said daisy-chain and the PTO port of said member PTDDC connected to the PTI port of a next PTDDC in said daisy-chain;
said plurality of PTDDCs are individually electrically coupled via said DDI port on said individual PTDDC to one of said plurality of said LDDs;
said daisy-chain comprises a first PTDDC at the beginning of said daisy-chain further comprising a first PTI port, a first PTO port, and a first DDI port; and
said first PTDDC is configured for connection to a host computer system (HCS) having a host bus adapter (HBA) via said first PTI port.

12. The daisy-chain storage synchronization method of claim 11 wherein said PTTRSM is configured to first initiate operation of said DDIRSM, then said PTORSM, and then said PTIRSM.

13. The daisy-chain storage synchronization method of claim 11 wherein said PTTRSM is configured to first initiate operation of said DDIRSM, then said PTORSM, and then said PTIRSM, and then report a logical block address (LBA) size to said PTI port equivalent to the sum of a LBA size retrieved from said DDI port and a LBA size retrieved from said PTO port.

14. The daisy-chain storage synchronization method of claim 11 wherein said PTTRSM is configured to first initiate operation of said PTORSM, then said DDIRSM, and then said PTIRSM.

15. The daisy-chain storage synchronization method of claim 11 wherein said PTTRSM is configured to first initiate simultaneous operation of said PTORSM and said DDIRSM, and then said PTIRSM.

16. The daisy-chain storage synchronization method of claim 11 wherein said PTTRSM is configured to first initiate operation of said PTORSM, then said DDIRSM, and then said PTIRSM, and then report a logical block address (LBA) size to said PTI port equivalent to the sum of a LBA size retrieved from said DDI port and a LBA size retrieved from said PTO port.

17. The daisy-chain storage synchronization method of claim 11 wherein said PTTRSM is configured to first initiate operation of said PTORSM, then said DDIRSM, and then said PTIRSM, and then report a fixed logical block address (LEA) size to said PTI port that is retrieved from non-volatile memory (NVRAM) within said PTDDC.

18. The daisy-chain storage synchronization, method of claim 11 wherein said PTTRSM is configured to first initiate operation of said PTORSM, then said DDIRSM, and then said PTIRSM, and then, report a fixed logical block address (LBA) size to said PTI port.

19. The daisy-chain storage synchronization method of claim 11 wherein said, first PTDDC maintains a set of phantom disk drive registers (PDR) having a reported maximum logical block address (LBA) virtual address space that is larger than the number of logical blocks present on each of said plurality of said LDDs.

20. The daisy-chain storage synchronization method of claim 11 wherein said first PTDDC maintains a set of phantom disk drive registers (PDR) having a reported, maximum logical block address (LBA) virtual address space that is larger than the number of logical blocks present on each of said plurality of said LDDs and said PDR are configured to present only a single SATA disk drive interface to said HCS.

* * * * *